US011605135B2

(12) United States Patent
Neag et al.

(10) Patent No.: US 11,605,135 B2
(45) Date of Patent: **\*Mar. 14, 2023**

(54) INTERACTIVE DATA SYSTEM

(71) Applicant: HARTFORD FIRE INSURANCE COMPANY, Hartford, CT (US)

(72) Inventors: Peter Neag, Torrington, CT (US); Kelly L. Trella, Meriden, CT (US); Jeffrey C. Thompson, Meridian, ID (US)

(73) Assignee: Hartford Fire Insurance Company, Hartford, CT (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/187,653

(22) Filed: Feb. 26, 2021

(65) Prior Publication Data

US 2021/0182975 A1 Jun. 17, 2021

Related U.S. Application Data

(63) Continuation of application No. 15/280,597, filed on Sep. 29, 2016, now Pat. No. 10,997,665, which is a (Continued)

(51) Int. Cl.
*G06Q 30/02* (2012.01)
*G06Q 40/08* (2012.01)
(Continued)

(52) U.S. Cl.
CPC ........... *G06Q 40/08* (2013.01); *G06F 3/0482* (2013.01); *G06Q 30/02* (2013.01);
(Continued)

(58) Field of Classification Search
None
See application file for complete search history.

(56) References Cited

U.S. PATENT DOCUMENTS 6,236,975 B1 5/2001 Boe et al.
6,411,936 B1 6/2002 Sanders
(Continued)

FOREIGN PATENT DOCUMENTS

WO 2001033831 A2 5/2001
WO WO-0133831 A2 * 5/2001 ............. G06Q 30/02

OTHER PUBLICATIONS

Keysurvey (Keysurvey.com, "Developing successful customer satisfaction survey", Aug. 2007, https://web.archive.Org/web/20070814184823/http://www.keysurvey.com/resources/whitepapers_full_text3.jsp) (Year: 2007).*

(Continued)

*Primary Examiner* — Mehmet Yesildag
(74) *Attorney, Agent, or Firm* — Howard IP Law Group, PC

(57) ABSTRACT

A computer system for remote interactive graphical display and data management includes a data storage device storing data records, a remote data acquisition computer configured to selectively trigger display actions for the data records based on at least a time-based rule and a time-independent rule; a classification engine configured to classify a response received from a remote display interface having user-selectable options arranged to define a scale of values, in one of two categories, a first category and a second category, being below a first threshold value being classified as being in the first category, and responses on the scale above a second threshold value being in the second category, and a display interface generator configured to selectively generate a supplemental interface or a conclusion message dependent on the category.

18 Claims, 22 Drawing Sheets

Related U.S. Application Data continuation-in-part of application No. 13/872,422, filed on Apr. 29, 2013, now abandoned, which is a continuation-in-part of application No. 13/666,342, filed on Nov. 1, 2012, now abandoned, which is a continuation-in-part of application No. 13/570,685, filed on Aug. 9, 2012, now abandoned.

(51) Int. Cl.
| | | |
|---|---|---|
| *G06F 3/0482* | (2013.01) | |
| *G06Q 30/0203* | (2023.01) | |
| *G10L 15/00* | (2013.01) | |
| *G06Q 50/00* | (2012.01) | |
| *G06F 3/04817* | (2022.01) | |
| *G06F 3/04842* | (2022.01) | |

(52) U.S. Cl.
CPC .......... *G06Q 30/0203* (2013.01); *G10L 15/00* (2013.01); *G06F 3/04817* (2013.01); *G06F 3/04842* (2013.01); *G06Q 50/01* (2013.01)

(56) References Cited

U.S. PATENT DOCUMENTS

| | | | |
|---|---|---|---|
| 7,593,871 | B1 | 9/2009 | Mesaros |
| 7,609,832 | B2 | 10/2009 | Kreiner et al. |
| 7,664,670 | B1 | 2/2010 | Weiss |
| 7,769,624 | B1 | 8/2010 | Armentano et al. |
| 7,962,962 | B2 * | 6/2011 | Adler .............. G06Q 10/10 713/182 |
| 8,121,853 | B2 | 2/2012 | Cates |
| 8,126,772 | B1 | 2/2012 | LeFebvre |
| 8,799,026 | B2 | 8/2014 | Rehor et al. |
| 2002/0002475 | A1 | 1/2002 | Freedman et al. |
| 2002/0035488 | A1 | 3/2002 | Aquila et al. |
| 2004/0064345 | A1 | 4/2004 | Ajamian et al. |
| 2004/0078235 | A1 | 4/2004 | Tallar, Jr. |
| 2004/0249665 | A1 | 12/2004 | David |
| 2005/0100158 | A1 * | 5/2005 | Kreiner .............. H04M 3/5166 379/265.02 |
| 2006/0095331 | A1 | 5/2006 | O'Malley et al. |
| 2006/0253316 | A1 | 11/2006 | Blackshaw et al. |
| 2007/0050256 | A1 | 3/2007 | Walker et al. |
| 2007/0061357 | A1 | 3/2007 | Jensen |
| 2007/0226018 | A1 | 9/2007 | Gross et al. |
| 2008/0010131 | A1 | 1/2008 | Bridges et al. |
| 2008/0065471 | A1 | 3/2008 | Reynolds et al. |
| 2008/0126136 | A1 | 5/2008 | Nighan |
| 2008/0189142 | A1 | 8/2008 | Brown et al. |
| 2008/0270218 | A1 | 10/2008 | Scott et al. |
| 2009/0024419 | A1 | 1/2009 | McClellan et al. |
| 2009/0157489 | A1 | 6/2009 | Leman |
| 2009/0222358 | A1 | 9/2009 | Bednarek |
| 2009/0254971 | A1 | 10/2009 | Frederick et al. |
| 2009/0276279 | A1 * | 11/2009 | Quesnel .............. G06Q 30/02 705/7.29 |
| 2011/0145019 | A1 | 6/2011 | Rehor et al. |
| 2011/0251847 | A1 * | 10/2011 | Cates .............. G06Q 10/063 705/1.1 |
| 2011/0258560 | A1 * | 10/2011 | Mercuri .............. G06F 16/958 709/204 |
| 2012/0029946 | A1 * | 2/2012 | Aquila .............. G06Q 40/02 705/4 |
| 2012/0290358 | A1 | 11/2012 | Cates |

OTHER PUBLICATIONS

Surveymonkey (The net promoter score, Aug. 4, 2012, http://web.archive.org/web/20120804001932/http://www.surveymonkey.corn/mp/net-promoter-score) (Year: 2012).*

Feine (Turn customer testimonials into brand megaphones, Feb. 2011, http://web.archive.org/web/20110211112749/http://raventools.corn/blog/customer-testimonials/) (Year: 2011).*

Consumers Stress Importance of Speed Over Settlement Amount in Insurance Claims Resolution, According to Accenture Survey, New York (Business Wire), Apr. 16, 2002, International Communications Research, [Download Mar. 4, 2008], download from Internet, URL: http://www.icrsurvey.com/Study_aspy?f=Accenture_claimis.html, 2pgs.

Donaldson, Don H., The Claims Department, "Factors Influencing Customer Loyalty and Retention", At least as early as Apr. 29, 2008, 3 pgs.

Feine, Suzy, "Turn customer testimonials into brand megaphones", Feb. 8, 2011, Internet Marketing Tools Blog, 4 pgs.

Inavero, Net Promoter Score, Jul. 2011, Inavero.com, http://web.archive.org/web/20110729025238/http:l/www_inavero.com/products-services/net-promoter-survey/net-promoter score/.

Keiningham, Timothy L. et al., The value of different customer satisfaction and loyalty metrics in predicting customer retention, recommendation, and share-of-wallet, Emerald, Managing Service Quality, vol. 17 No. 4, pp. 361-384, 2007, http://www2.owen.vanderbilt.edu/bruce.cooil/documents/publications/msq2007.pdf.

Keysurvey.com, "Developing successful customer satisfaction survey", Aug. 2007, https ://web. archive.org/Web/20070814184823/http ://www.keysurvey.com/resourcesf/whitepapersfu I Itext3 .jsp.

Merriam-Webster.com, partner, Apr. 2007, https://web.archive.org/web/20070426022340/http:I/merriam-webster.com/dictionary/partner, 1 page.

Progressive Insurance Gets Progressive with Net Promoter Score, Oct. 2007, AVAYA, [Download Mar. 4, 2008], download from Internet, URL: http://www.avaya.com/gcm/master-usa/en-us/newsletter/article/2007-1 0/article02-insurance . . . . ,4pgs.

Surveymonkey, The net promoter score, Aug. 4, 2012, surveymonkey.com, http://web.archive.org/web/20120804001932/http://www.surveymonkey.com/mp/net-promoter-score.

\* cited by examiner

INTERACTIVE DATA SYSTEM

CROSS REFERENCE TO RELATED APPLICATIONS

This application is a continuation application of co-pending U.S. patent application Ser. No. 15/280,597, filed on Sep. 29, 2016, which is in turn a continuation-in-part of U.S. patent application Ser. No. 13/872,422, filed on Apr. 29, 2013, which is in turn a continuation-in-part of U.S. patent application Ser. No. 13/666,342, filed on Nov. 1, 2012, which is a continuation-in-part of U.S. patent application Ser. No. 13/570,685, filed on Aug. 9, 2012, the entire contents of each of which are incorporated herein by reference for all purposes.

FIELD

The present invention relates to computer systems and more particularly to computer systems that are utilized in connection with interactions with remote selective interactive user-accessible data displays.

BACKGROUND

Marketing experts are coming to recognize that engendering customer loyalty is a crucial ingredient in generating increased profitability. Typical tools for measuring customer loyalty include surveying customers after completion of interaction between customers and company employees. Results of such surveys can be employed to improve employee training and designs of customer service practices. Similarly, survey results may be used to inform an appropriate allocation of resources, such as funding and information technology resources, to better serve customers. Such improvements may lead to future increases in customer loyalty. In some cases, an insurance company or agent may wish to use comments and other information about a customer to better improve service and/or to offer additional services that might be of interest to that customer. In some cases, an insurance company or agent may wish to use comments and other information about a customer in testimonial marketing messages (e.g., web-based advertising, etc.). For example, an insurance company may utilize one or more "third party administrators" to help facilitate claims processing in connection with insurance policies. In this case, survey results may be used to assess the performance of the third party administrators and/or to improve the service being provided. By way of further example, an insurance company may utilize one or more sales or distribution partners to help facilitate the marketing of other insurance policies. It can be difficult, however, to determine which customers and/or customer responses would be suitable for such purposes by manually reviewing the feedback information.

SUMMARY

A system is disclosed for customer feedback acquisition and processing. The system includes a data acquisition processor for receiving customer feedback responses to customer loyalty surveys. The customer feedback response may be, for example, received by the data acquisition processor after notice of an insurance claim is received and/or before the claim is resolved. According to some embodiments, the customer feedback response may be received after a claim is resolved. The data acquisition processor may operative to classify the customer feedback response in one of two categories. The two categories are a "potential-promoter" category and a "non-potential-promoter" category. When a customer feedback response is categorized as being in the potential-promoter category, he or she may receive a supplemental portion of the loyalty survey (e.g., asking for his or her permission to be included in a testimonial marketing message).

In addition, the system includes a database storage unit in communication with the data acquisition processor for storing data that represents customer feedback responses.

By providing the supplemental portion of the loyalty survey to only those customers who have provided feedback that has been automatically categorized as being in the potential-promoter category, embodiments may provide for the efficient generation of testimonial marketing messages.

A system is disclosed for customer feedback acquisition and processing. The system includes a data acquisition processor for receiving a customer feedback response to a loyalty survey, the customer feedback being received after a notice of an insurance claim associated with an insurance entity and a customer is received. The processor may also determine a loyalty rating for the customer based on the received customer feedback response, and, based on the loyalty rating, automatically transmit information associated with the customer to a party other than the insurance entity.

In addition, the system includes a database storage unit in communication with the data acquisition processor for storing data that represents customer feedback responses.

By transmitting information associated with certain customers to a party other than the insurance entity, embodiments may provide for the efficient use of feedback information to improve services and/or to offer additional services to customers.

A system is disclosed for customer feedback acquisition and processing. The system includes a data acquisition processor for receiving a customer feedback response to a loyalty survey, the customer feedback being received after a notice of an insurance claim associated with an insurance entity and a customer is received. The processor may also determine a loyalty rating for the customer based on the received customer feedback response, and, based on the loyalty rating, automatically transmit information associated with the customer to a partner platform, such as a sales or distribution partner platform or an end customer platform.

In addition, the system includes a database storage unit in communication with the data acquisition processor for storing data that represents customer feedback responses. By transmitting information associated with certain customers to a partner platform, embodiments may provide for the efficient use of feedback information to improve services and/or to offer additional services to customers.

With these and other advantages and features of the invention that will become hereinafter apparent, the invention may be more clearly understood by reference to the following detailed description of the invention, the appended claims, and the drawings attached hereto.

DETAILED DESCRIPTION

In general, and for the purposes of introducing concepts of embodiments of the present invention, a computer system is utilized to direct employees or vendors to conduct surveys relating to closed claim files and/or to claims that have yet to be resolved (e.g., interim surveys). Responses to latter interim surveys may be, for example, evaluated to detect when the open claims are going off-track from the claimant's point of view. Remedial action may be triggered through the computer system to rescue the handling of the claim and to secure the claimant's satisfaction and loyalty. Results from one or both types of surveys are screened to detect customers who display loyalty, and in those cases the computer system triggers cross-selling initiatives. Moreover, customers who display loyalty may be automatically asked if information about them can be included in testimonial marketing messages.

Figure 1:
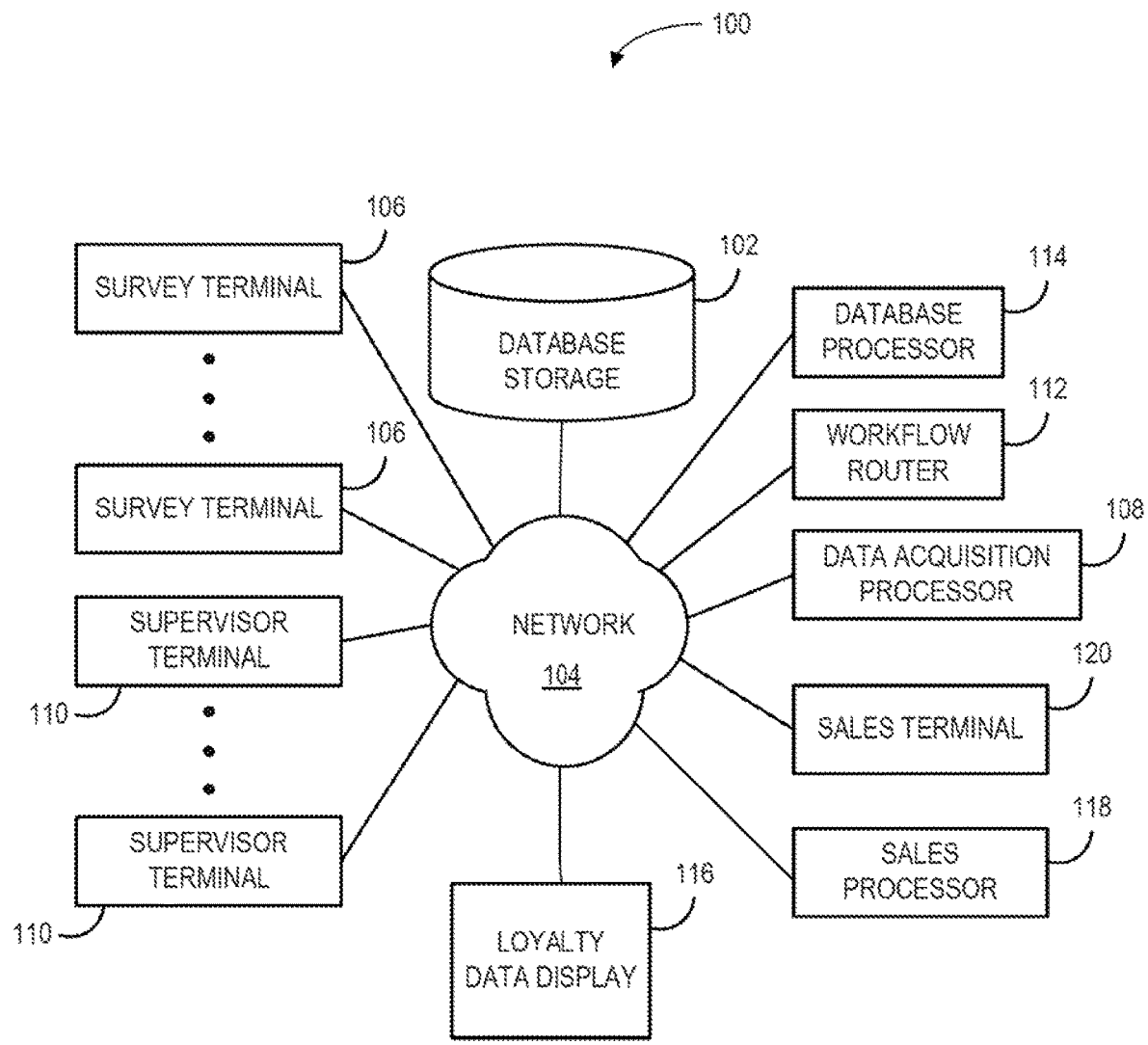
FIG. 1 is a partially functional block diagram that illustrates aspects of a computer system provided in accordance with some embodiments of the invention.

Features of some embodiments of the present invention will now be described by first referring to FIG. 1. FIG. 1 is a partially functional block diagram that illustrates aspects of a computer system 100 provided in accordance with some embodiments of the invention. For present purposes it will be assumed that the computer system 100 is operated by an insurance company (not separately shown) for the purpose of building, gauging and gaining benefits from customer loyalty.

The computer system 100 includes a database storage module 102. In terms of its hardware the data storage module 102 may be conventional, and may be composed, for example, by one or more magnetic hard disk drives. A function performed by the data storage module 102 in the computer system 100 is to receive, store and provide access to files relating to insurance claims. The claims may be from one or more different lines of insurance, such as worker's compensation, property and casualty, automobile, etc. The data storage module 102 may also store data that reflects responses by claimants to the customer satisfaction surveys that are described below. The customers who are to be surveyed may be policy holders who are making a claim or alternatively may be non-policy-holders such as individuals whose vehicles sustained damage in a collision with insured vehicles. Both groups of individuals will hereinafter sometimes be referred to as "claimants" or "customers". Still other data may be stored in the data storage module 102, including for example data that is relevant to testimonial marketing messages and/or to providing selling propositions to claimants who have indicated loyalty to the insurance company. Where the claimant is not a policy holder, the selling proposition may be designed to convert the claimant into a customer. Where the claimant is already a policy holder, the selling proposition may be designed to take advantage of a cross-selling opportunity.

The data stored in regard to the customer satisfaction surveys may include recordings of the claimants' voices. Although the data storage module 102 is depicted as a single device in FIG. 1, in practice its functions may be spread among a number of different devices, such as plural server computers which incorporate their own storage capabilities.

The computer system 100 may also include a data communication network 104 to which the data storage module 102 is coupled. The data communication network 104 may for example be conventional in its construction and functionality, and may serve as an "intranet" for the insurance company. In some embodiments the data communication network may also incorporate and/or be connected to a public data communication network (not separately shown) such as the Internet.

The computer system 100 may further include a number of terminals 106 that may be employed by employees of the insurance company who are assigned to conduct customer satisfaction surveys in regard to the company's handling of insurance claims. As will be seen, the terminals 106 (hereinafter referred to as "survey terminals"), may be constituted by conventional personal computers coupled to the data communication network 104. One function that may be performed by the survey terminals 106 is to input data indicative of claimants' responses to interim and final customer satisfaction surveys.

In addition, the computer system 100 may include a data acquisition processor 108 that is also coupled to the data communication network 104. The data acquisition processor 108 may be constituted by one or more conventional microprocessors included in one or more server computers (not separately shown in FIG. 1) that may be programmed to function in accordance with the present invention. The data acquisition processor 108 may function to receive the customer feedback response data from the survey terminals 106 (via the data communication network 104) and to store the customer feedback response data in the database storage module 102. The data acquisition processor may also classify the customer feedback responses as to whether the responses are satisfactory, unsatisfactory, indicative of customer loyalty, etc. (In some embodiments, the responses may be at least partially so classified at the survey terminals 106, in which case the data acquisition processor 108 may be deemed to at least partially overlap with the survey terminals 106.)

Still further, the computer system 100 may include a number of terminals 110 operated by supervisory employees of the insurance company. Like the survey terminals 106, the terminals 110 (hereinafter referred to as "supervisor terminals") may be constituted by conventional personal computers coupled to the data communication network 104. The supervisory employees who operate the supervisor terminals 110 may be charged with supervising claim handlers whose claim files are stored in the data storage module 102.

Moreover, the computer system 100 may include a workflow router 112 that is coupled to the data communication network 104 and thus is in communication, at least from time to time, with the data acquisition processor 108. The workflow router 112 may be constituted by one or more conventional microprocessors that may for example be included in one or more conventional server computers (not separately shown in FIG. 1). For example, the workflow router 112 may at least partially overlap with the data acquisition processor 108. The workflow router may operate to route, to the supervisor terminals 110, claim files determined, from claimants' responses to interim customer satisfaction surveys, to be in need of remedial attention to achieve customer satisfaction. In some embodiments, the workflow router may also operate to capture and record actions taken by supervisors in response to the messages to them that indicate a need for remedial attention.

The computer system 100 may also include a database processor 114 that is coupled to the data communication network 104, and thus is in communication, at least from time to time, with the database storage module 104. The database processor may be constituted by one or more conventional microprocessors that may for example be included in one more conventional server computers (not separately shown in FIG. 1) that may be programmed to function in accordance with the present invention. For example, the database processor 114 may at least partially overlap with the data acquisition processor 108. The database processor 114 may operate to identify and report trends in customer feedback response data stored in the database storage module 104 by the data acquisition processor 108.

Still further, the computer system 100 may include a display device 116 that is coupled to the data communication network 104. Accordingly, the display device 116 may be in communication, at least from time to time, with the database processor 114. As will be appreciated from subsequent discussion, the display device 116 may be employed to provide one or more screen displays concerning customer feedback responses to interim and/or final surveys, including summaries, trends and/or aggregations of customer feedback response data.

In addition, the computer system 100 may include a sales processor 118 that is coupled to the data communication network 104. The sales processor 118 may be in communication, at least from time to time, with the database storage module 102, the data acquisition processor 108 and the workflow router 112. The sales processor may be constituted by one or more conventional processors that may for example be part of one or more conventional server computers (not separately shown) that may be programmed to function in accordance with the present invention.

Also, the computer system 100 may include a sales terminal 120 coupled to the data communication network 104 and thus in communication, at least from time to time, with the workflow router 112. The sales terminal 120 may for example be constituted by a conventional personal computer that may be programmed to function in accordance with the present invention. According to some embodiments, data acquisition processor 108, the sales processor 118 and/or sales terminal 120 may be configured to provide testimonial marking messages including information about one or more customers or claimants (e.g., when a customer has been categorized as a "potential promoter").

As will be understood from subsequent discussion, the data acquisition processor 108 (possibly in conjunction with one or more other components of the computer system 100) may operate to selectively classify customer feedback responses to the final survey as "company-loyal", i.e., as evidencing customer loyalty toward the insurance company that operates the computer system 100. In response to such a classification of a customer feedback response, the sales processor may generate a selling proposition for the customer in question. For example, a selling proposition may include an offer to supply to the customer a policy for a line of insurance that the customer does not currently have in force with the insurance company. The workflow router 112 may operate to route the selling proposition to the sales terminal 120. The sales terminal may be operated by a sales agent or other employee of the insurance company or of an affiliate of the insurance company, such as an independent insurance agent or another insurance company affiliated with the insurance company that operates the computer system 100.

Figure 2:
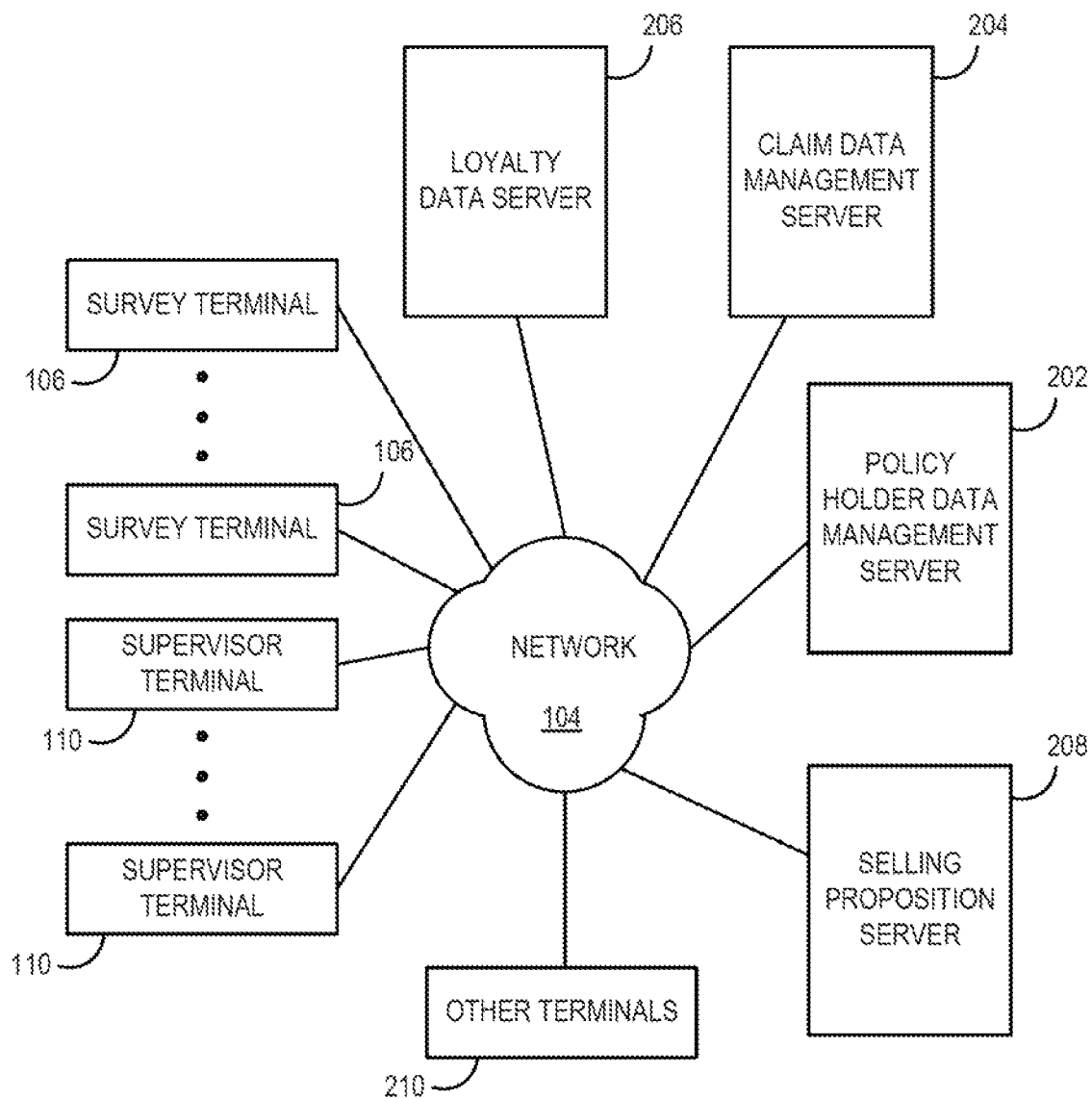
FIG. 2 is a block diagram that provides another representation of aspects of the system of FIG. 1.

In some embodiments, a customer who exhibits loyalty to the insurance company may be asked to consent to the company sending an electronic mail message to friends, family and/or business associates of the customer to present the customer's endorsement of the insurance company and to ask those individuals to become customers of the insurance company. FIG. 2 is a block diagram that provides another representation of aspects of the computer system 100. FIG. 2 shows the same data communication network 104, survey terminals 106 and supervisor terminals 110 that were depicted in, and described in connection with, FIG. 1. FIG. 2 also depicts other components of the computer system 100 in a more hardware-oriented manner than FIG. 1. Thus, other components of the computer system 100 shown in FIG. 2 may constitute components of the system that were functionally depicted in FIG. 1. For example, the computer system 100 may include a policy holder data management server computer 202 and a claim data management server computer 204. The latter two servers may together constitute some or all of the functionality ascribed above to the data storage module 102 shown in FIG. 1. The policy holder data management server computer 202 and the claim data management server computer 204 may both be constituted and operated in a substantially conventional manner. The policy holder data management server computer 202 may store data concerning policies in force with the insurance company, including names, addresses, etc. of policy holders, types and terms of coverage, policy effective dates, coverage amounts, etc. The claim data management server computer 204 may store data concerning claims made against the insurance company, includes names and addresses of claimants, date of loss, and all other information accumulated during investigation and settlement/resolution of the claims.

Other components of the computer system 100 not explicitly depicted in FIG. 1, but shown in FIG. 2, may include a loyalty data server computer 206 and selling proposition server computer 208. Both of the latter server computers are described below. Further, the computer system 100 may include a number of other terminals 210, which may be conventional personal computers operated by various employees of the insurance company and/or its affiliates. Such employees may be, for example, individuals performing line and/or staff management functions, claim handlers, clerical and administrative employees, sales employees, etc. At least some of the other terminals 210 (like the terminals 106, 110) may include a conventional screen display (not separately shown in FIG. 2) for presenting to the user screen displays generated on the terminal in question or downloaded from another component of the computer system 100.

The computer system 100 may include other server computers (e.g., one or more billing servers) in addition to the server computers shown in FIG. 2. The functions ascribed to individual server computers herein may in practice be divided up among two or more different computers. Also, the functions shown or described as being performed in separate computers may in practice be combined within a single computer.

Figure 3:
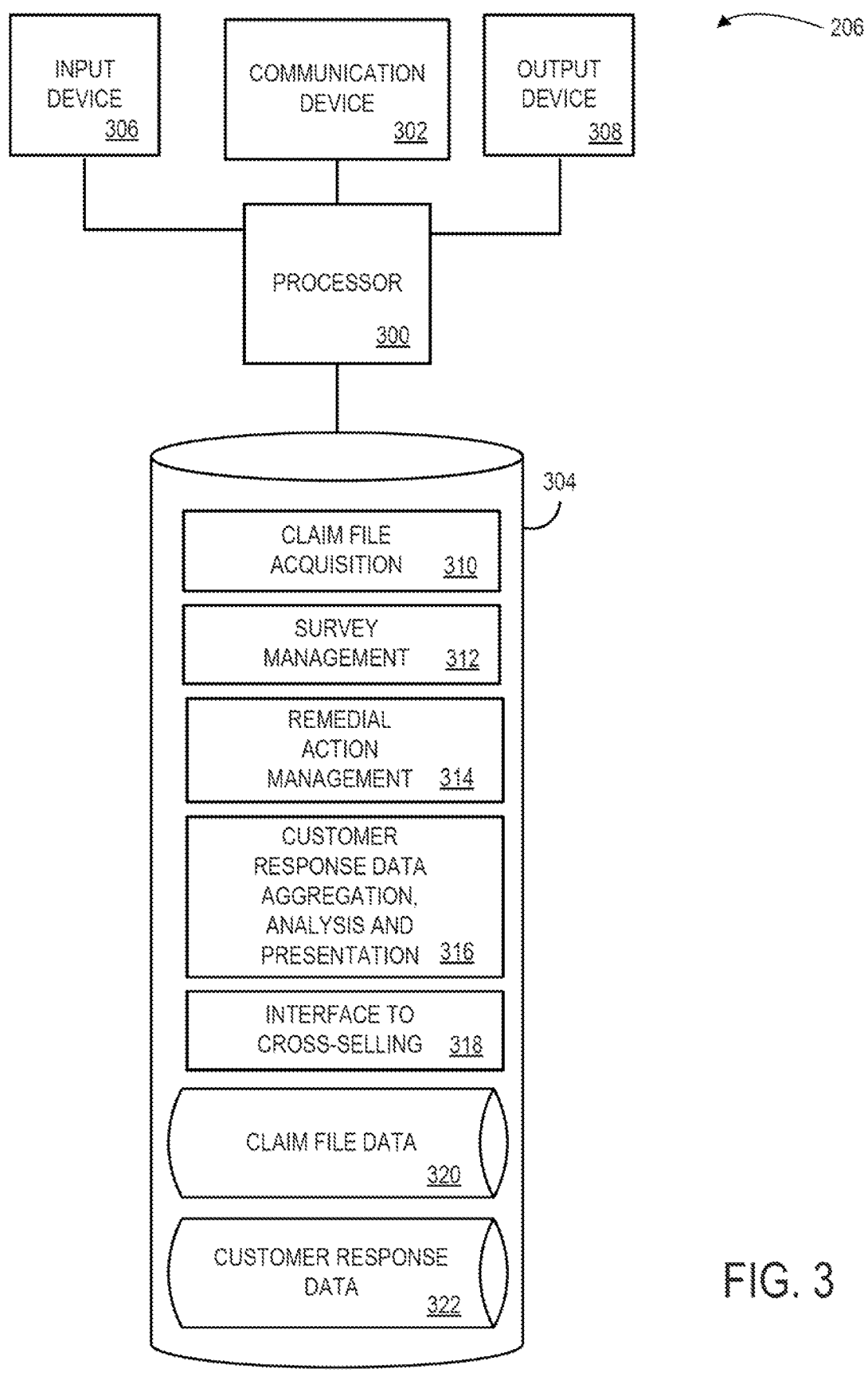
FIG. 3 is a block diagram that illustrates a loyalty data server computer that may form part of the system of FIGS. 1 and 2.

FIG. 3 is a block diagram that illustrates the loyalty data server computer 206. In its hardware aspects the loyalty data server computer 206 may be entirely conventional, but programmed to provide functionality as described herein. As depicted, the loyalty data server computer 206 includes a computer processor 300 operatively coupled to a communication device 302, a storage device 304, an input device or devices 306 and an output device 308. Communication device 302 may be used to facilitate communication with, for example, other servers/terminals/personal computers coupled to the data communication network 104 (FIG. 1). Continuing to refer to FIG. 3, the input device(s) 306 may comprise, for example, a keyboard, a keypad, a mouse or other pointing device, a microphone, knob or a switch, an infra-red (IR) port, a docking station, and/or a touch screen. The input device(s) 306 may be used, for example, to enter information. Output device 308 may comprise, for example, a display (e.g., a display screen), a speaker, and/or a printer. (Functionally, the terminals 106, 110 and/or 210 shown in FIG. 2 may also serve to output/display information downloaded thereto from the loyalty data server computer 206.)

Storage device 304 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 304 stores one or more programs or portions of programs (at least some of which being indicated by blocks 310-318) for controlling processor 300. Processor 300 performs instructions of the programs, and thereby operates in accordance with the present invention. In some embodiments, the programs may include a program or program module 310 that programs the loyalty data server computer 206 to acquire claim files (or excerpts therefrom) for which customer satisfaction surveys are to be performed.

Another program or program module stored on the storage device 304 is indicated at block 312 and is operative to allow the loyalty data server computer 206 to assign and manage administration of the customer satisfaction surveys.

Still another program or program module stored on the storage device 304 is indicated at block 314. Program (or program module) 314 may program the loyalty data server computer 206 to initiate, route and/or manage tasks that are to be performed to perform remedial action with respect to open claim files for which claimants' responses to interim surveys indicate that the claimant is dissatisfied with the handling to date of the claim.

Another program/program module 316 programs the loyalty data server computer 206 to gather, receive, store and analyze data that represents claimants' responses to the interim and final customer satisfaction surveys. Among other functions that the program/program module 316 may cause the loyalty data server computer 206 to perform are aggregation of the claimants' responses and presentation of the aggregated response data to management and/or other employees of the insurance company.

A further program/program module 318 provides an interface between other program functions of the loyalty data server computer 206 and the selling proposition server computer 208 (FIG. 2). According to some embodiments, this program/program module 318 may further facilitate the generation of testimonial marketing messages that include information about customers.

There may also be stored in the storage device 304 other software, such as one or more conventional operating systems, device drivers, communications software, database management software, etc.

Still further, various kinds of data needed for operation of the loyalty data server computer 206 may be stored in the storage device 304, including for example claim file data 320, and customer/claimant response data 322 gathered in response to the above-mentioned surveys.

Figure 4:
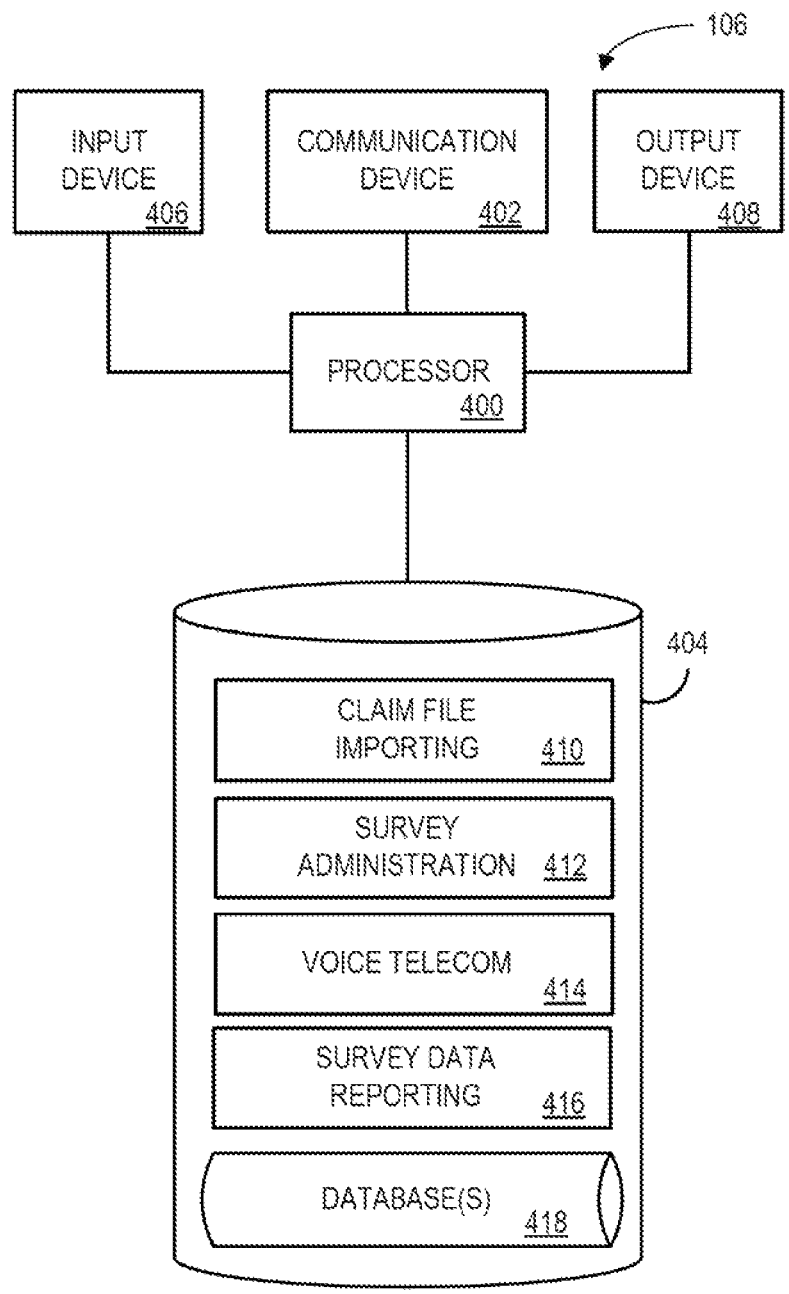
FIG. 4 is a block diagram that illustrates a personal computer that may be employed as a terminal for a survey employee in the system of FIGS. 1 and 2.

FIG. 4 is a block diagram that illustrates a typical one of the survey terminals 106 shown in FIGS. 1 and 2. In its hardware aspects, the survey terminal 106 may be entirely conventional, but may be programmed and/or may download interactive webpages so as to function in accordance with aspects of the present invention.

As depicted, the survey terminal 106 includes a computer processor 400 operatively coupled to a communication device 402, a storage device 404, an input device or devices 406 and an output device or devices 408. Communication device 402 may be used to facilitate communication with, for example, servers (e.g., the loyalty data server computer 206) and/or other terminals/personal computers coupled to the data communication network 104 (FIG. 1). Continuing to refer to FIG. 4, the input device(s) 406 may comprise, for example, a keyboard, a keypad, a mouse or other pointing device, a microphone, knob or a switch, an infra-red (IR) port, a docking station, and/or a touch screen. The input device(s) 406 may be used, for example, to enter information. Output device 408 may comprise, for example, a display (e.g., a display screen), a speaker, and/or a printer. In some preferred embodiments, the output device(s) 408 and the input device(s) 406 may collectively include a telephone handset and/or headset and/or speakerphone arrangement by which the user of the survey terminal 106 may engage in telephone conversations with claimants to whom the user administers customer satisfaction surveys. Data representing the telephone conversations (including either or both of the user's (survey employee's) voice and the claimant's voice) may pass through the survey terminal 106 as part of the voice communication channel between the survey employee and the claimant. At the same time, at least some of the voice data, including possibly the claimant's voice, may be stored in the storage device 404 for subsequent uploading to the loyalty data server computer 206.

Storage device 404 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 404 stores one or more programs or portions of programs (at least some of which being indicated by blocks 410-416) for controlling processor 400. Processor 400 performs instructions of the programs, and thereby operates in accordance with the present invention. In some embodiments, the programs may include a program or program module 410 that programs the survey terminal 106 to acquire (e.g., from the loyalty data server computer 206) claim files (or excerpts therefrom) for which customer satisfaction surveys are to be performed. In some embodiments, the program/program module 410 may be at least partially constituted by a browser program by which the user may access the user's work queue (stored, e.g., on the loyalty data server computer 206) and may access the individual claim files/file extracts by clicking on individual items in the user's work queue.

Another program or program module stored on the storage device 404 is indicated at block 412 and is operative to cause the survey terminal 106 to guide/prompt the user in administering the customer satisfaction surveys.

Still another program or program module stored on the storage device 404 is indicated at block 314. Program (or program module) 414 may control the survey terminal 106 so as to enable operation of the above-mentioned telephone terminal equipment that may be part of the survey terminal 106. In addition, or alternatively, the survey terminal 106 may include a dedicated voice/telecom card (not separately shown) which effectively couples the telephone terminal equipment to the processor 400 and drives/receives voice signals from the telephone terminal equipment.

Another program/program module 316 programs the survey terminal 106 to receive, store, and forward to the loyalty data server computer 206, data that represents claimants' responses to the interim and final customer satisfaction surveys.

There may also be stored in the storage device 404 other software, such as one or more conventional operating systems, device drivers, communications software, database management software, etc. Still further, various kinds of data needed for operation of the survey terminal 106 may be stored in the storage device 404, as indicated at 418 in FIG. 4.

Figure 5:
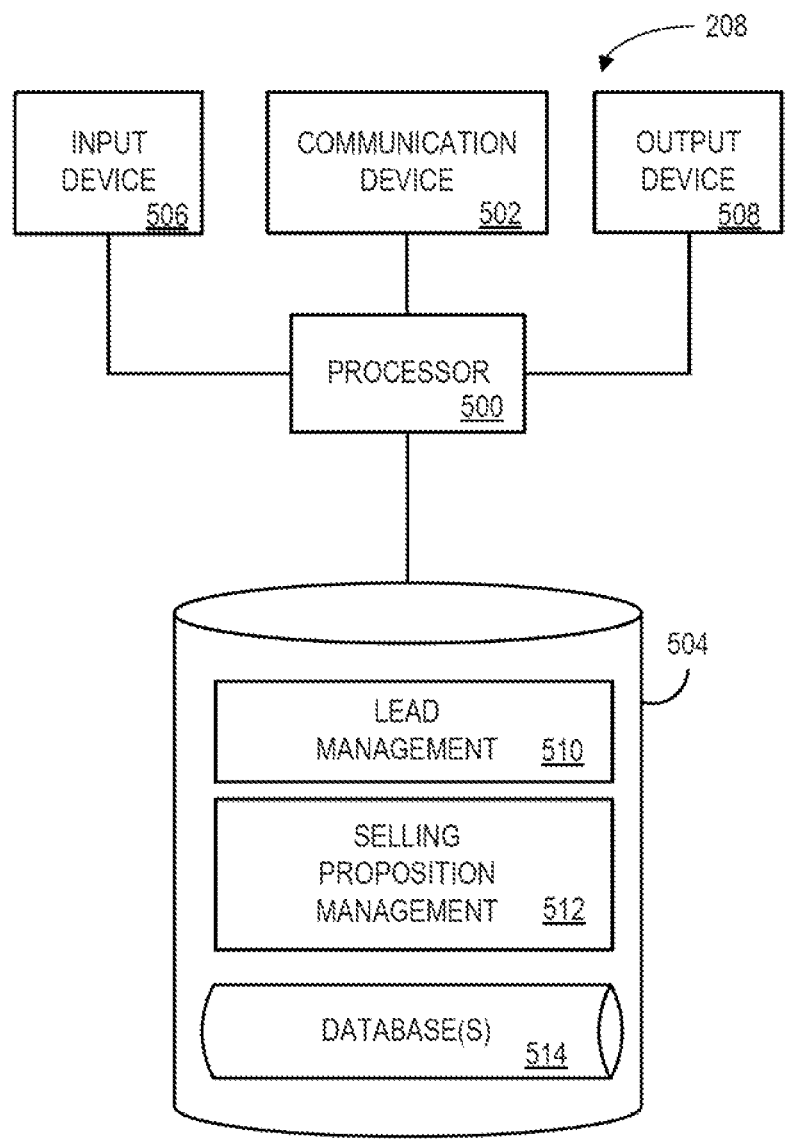
FIG. 5 is a block diagram that illustrates a selling proposition server computer that may form part of the system of FIGS. 1 and 2.

FIG. 5 is a block diagram that illustrates the selling proposition server computer 208. Once again, the hardware aspects of this component may be entirely conventional, but the component may be programmed so as to perform functions in accordance with aspects of the present invention.

As depicted, the selling proposition server computer 208 includes a computer processor 500 operatively coupled to a communication device 502, a storage device 504, an input device or devices 506 and an output device 508. Communication device 502 may be used to facilitate communication with, for example, other servers/terminals/personal computers coupled to the data communication network 104 (FIG. 1). Continuing to refer to FIG. 5, the input device(s) 506 may comprise, for example, a keyboard, a keypad, a mouse or other pointing device, a microphone, knob or a switch, an infra-red (IR) port, a docking station, and/or a touch screen. The input device(s) 506 may be used, for example, to enter information. Output device 508 may comprise, for example, a display (e.g., a display screen), a speaker, and/or a printer. (Functionally, the terminals 210 shown in FIG. 2—including e.g. one or more of such terminals functioning as a sales terminal 120 as shown in FIG. 1—may also serve to output/display information downloaded thereto from the selling proposition server computer 208.)

Storage device 504 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 504 stores one or more programs or portions of programs (at least some of which being indicated by blocks 510, 512) for controlling processor 500. Processor 500 performs instructions of the programs, and thereby operates in accordance with the present invention. In some embodiments, the programs may include a program or program module 510 that programs selling proposition server computer 208 to receive, from the loyalty data server computer 206, data that identifies and/or provides contact information for claimants whose survey responses indicate that they are at least potentially loyal to the insurance company. The selling proposition server computer 208 may treat this information as constituting sales leads, and may manage it accordingly, under control by the program/program module 510.

Another program or program module stored on the storage device 504 is indicated at block 512 and is operative to program the selling proposition server computer 208 to generate and manage targeted selling propositions suitable for the individuals identified by the sales leads forwarded to the selling proposition server computer 208 from the loyalty data server computer 206. According to some embodiments, the program or program module stored on the storage device 504 at block 512 may facilitate generation of testimonial marketing messages. There may also be stored in the storage device 504 other software, such as one or more conventional operating systems, device drivers, communications software, database management software, etc. Still further, various kinds of data needed for operation of the selling proposition server computer 208 may be stored in the storage device 504, as indicated at 514 in FIG. 5.

Figure 6:
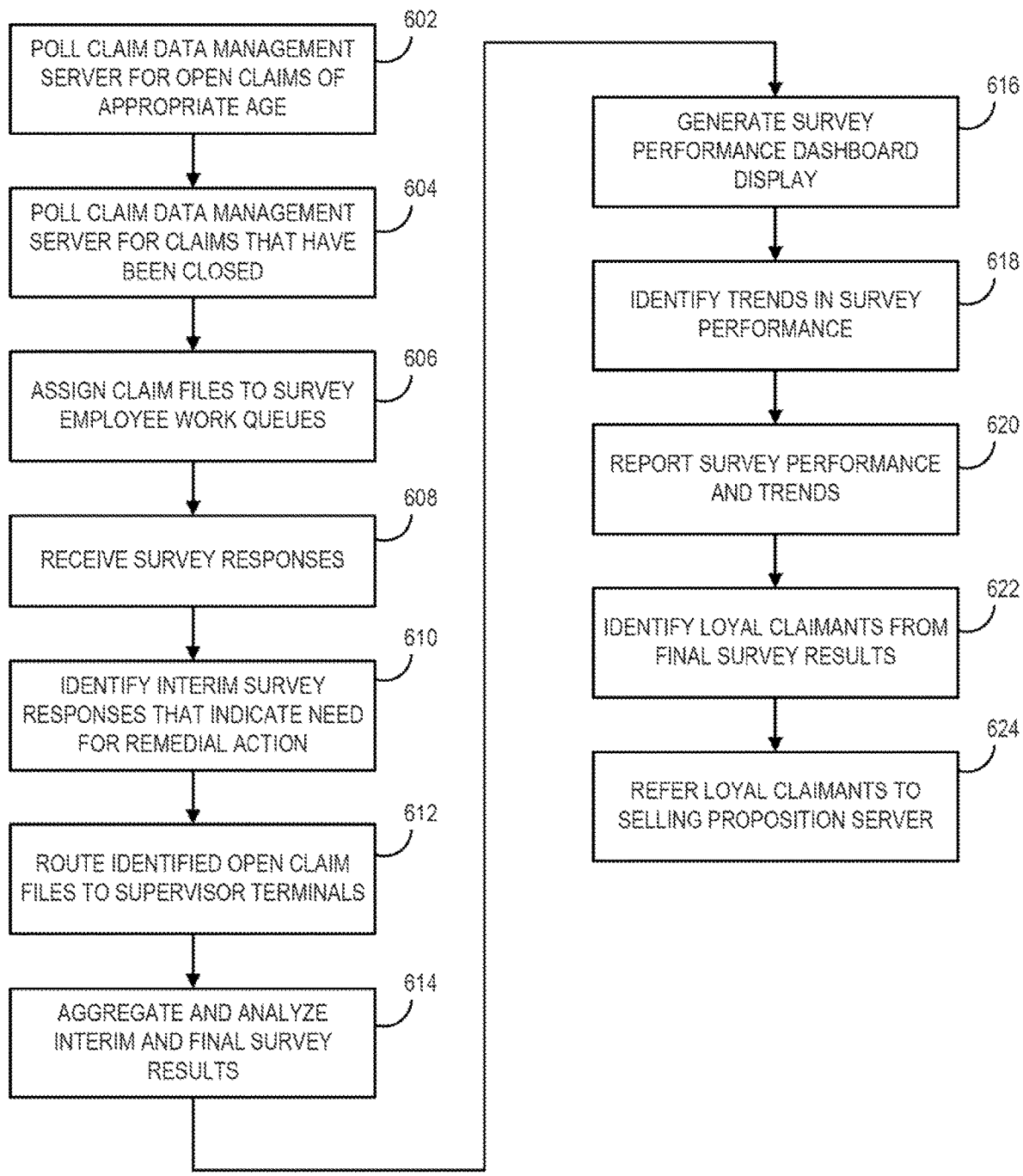
FIG. 6 is a flow chart that illustrates a process that may be performed by the loyalty data server computer of FIG. 3.

FIG. 6 is a flow chart that illustrates a process that may be performed by the loyalty data server computer 206. At 602 in FIG. 6, the loyalty data server computer 206 makes contact with the claim data management server computer 204 to determine whether there are open claim files that are currently suitable for administering interim customer satisfaction surveys to the claimants that correspond to the files. For example, the loyalty data server computer 206 may learn from the claim data management server computer 204 what claim files have been open for a certain number of days and have not yet been closed/resolved. In some embodiments, the point in time at which a claim file is deemed "ripe" for an interim survey may vary with the type of claim. For example, a worker's compensation case may be ripe for an interim survey a different number of days after first notice of loss (FNOL) than an automobile damage claim. Similarly, a property damage claim may be ripe for an interim survey at still a different number of days after FNOL. In some embodiments, and/or for certain types of claims, an interim survey may preferably be performed 5, 10 or 15 days after FNOL. The number of days may vary with the type of claim because the timing of an activity to be performed in connection with a claim may vary with the type of claim. In some embodiments, open claims of a suitable age (=days since FNOL) may be randomly selected for interim survey from the universe of such claims. In some embodiments, some open claims may be disqualified from interim survey by certain factors; e.g., claims involving a fatality or litigation may be disqualified. In some embodiments, all qualified open claims may be interim surveyed. Step 602 may also include the loyalty data server computer 206 obtaining the pertinent claim files or file extracts, or hyperlinks pointing to the same, from the claim data management server computer 204.

At 604, the loyalty data server computer 206 makes contact with the claim data management server computer 204 to determine whether there are files eligible for a subsequent (potentially, final) customer satisfaction survey. This step may also include the loyalty data server computer 206 obtaining the pertinent claim files or file extracts, or hyperlinks pointing to them, from the claim data management server computer 204. The subsequent survey may be triggered by a certain event, which may vary with type of claim. For example, for a property damage claim, the subsequent survey may be triggered by closing of the claim file or payment of the claim. In some cases, a subsequent survey may be triggered by subrogation. For a worker's compensation claim, the subsequent survey may be triggered at a set time (e.g., 120 days after FNOL) or upon transition to handling of the file by a nurse claim manager.

In some embodiments, there may be more than one subsequent survey, and thus a total of three or more surveys for the claim. In some embodiments, surveys may be initiated on an ad hoc basis. For example, in the case of a catastrophic loss event, some or all claimants may be surveyed to evaluate how well the insurance company has responded to the catastrophic event.

In some cases, a pattern in the responses to one survey may suggest a need or advantage for an additional survey to gain more information concerning issues raised by the survey responses. For example, it may be detect that a large number of customers are providing a "Do Not Know" response to a survey question. In this case, a follow question or survey might be implemented to dig deeper into the situation (e.g., to determine if customers don't understand a portion of the survey). At 606, the loyalty data server computer 206 assigns either or both open claim files (for interim customer satisfaction surveys) or closed claim files (for final customer satisfaction surveys) among the survey employees available to perform such surveys. In some embodiments, the assignment of claim files to survey employees is entirely random. In other embodiments, the assignment of claim files to survey employees is partially random, but also reflects the survey employees' experience with respect to type of claim, line of insurance and/or with respect to conducting interim versus final customer satisfaction surveys. In some embodiments, assignments of closed claim files are preferably or mandatorily made to the same survey employee who conducted an interim customer satisfaction survey (if any) for the closed claim file in question. In other embodiments, it is preferred or mandatory that the survey employee assigned to administer the final customer satisfaction survey not be the same individual who conducted an interim survey for the claim.

In some embodiments, assignment of a claim file (either open or closed, as the case may be) to a survey employee may be accomplished by the loyalty data server computer 206 placing a corresponding hyperlink in the survey employee's work queue. Alternatively, the loyalty data server computer 206 may effect assignment of the claim file to the survey employee by sending to the survey employee an electronic mail message which contains such a hyperlink. Either of these actions may be considered to constitute "routing" the claim file to the survey employee and/or to his/her survey terminal 106. In assigning the claim files, the loyalty data server computer 206 may append or link thereto the appropriate survey script for guiding the survey employee in conducting the desired customer satisfaction survey. In the case of an open claim file, the appended survey script may be suitable for conducting an interim customer satisfaction survey. In the case of a closed/resolved claim file, the appended survey script may be suitable for conducting a final customer satisfaction survey. In either case, the survey script may be tailored as appropriate to the type of claim and/or to details of the particular claim or attributes of the claimant. Examples of survey scripts will be described below in conjunction with the process illustrated in FIG. 8.

Continuing to refer to FIG. 6, at 608 the loyalty data server computer 206 may receive, from the survey terminals 106, data that reflects the claimants' responses to the interim and final customer satisfaction surveys. In some embodiments, this data may include entries made by the survey employees to characterize the claimants' responses as requiring further attention ("attention-needed") or not requiring further attention ("attention-not-needed"). In some embodiments, the responses, whether explicitly stated by the claimants or characterized by the survey employees, may be on a numerical scale from best to worst (or vice versa). In some embodiments, the data received by the loyalty data server computer 206 from the survey terminals 106 may include data that represents recordings of claimants' voices and/or survey employees' voices recorded during the course of the surveys. In some embodiments, the customer's response to a "scale of 1-10" satisfaction question may be used to categorize the customer as "loyal", "passive", or potentially a "detractor". Responses to further questions, or reasons given by the customer for his/her satisfaction rating, may be used to assign the customer to a more detailed category or subcategory. Voice recognition and/or machine text analysis may be used for this purpose, or the survey employee may make the categorization/sub-categorization of the customer. Either the satisfaction rating alone, or details of the customer's response, or a question asked by the customer, may lead to the claim file being flagged as "attention-needed". Note that according to some embodiments, certain customers may be identified as "potential-promoters" of the insurance entity. In this case, those customers might be asked for permission to include information about them in a testimonial marketing message.

At 610, and based on claimants' responses to interim surveys, the loyalty data server computer 206 identifies open claim files for which remedial action should be taken. That is, the loyalty data server computer 206 identifies open claim files for which the claimants' responses indicated that the claimants were not satisfied with the manner in which the insurance company was handling their claims. Then, at 612, the loyalty data server computer 206 routes each such open claim files to the supervisor terminal 110 operated by the supervisor of the claim handler to whom the claim file was assigned for processing. In some embodiments, the supervisor in question for the open claim file, and/or a network address for his/her supervisor terminal 110, and/or the supervisor's e-mail address may be included in the open claim file or extract that the loyalty data server computer 206 obtained for the claim in question from the claim data management server computer 204. In other embodiments, or other cases, the loyalty data server computer 206 obtains the identity/network address of the supervisor from the claim data management server computer 204 after identifying the open claim file as being in need of remedial action.

In some embodiments, step 612 may be accomplished by the loyalty data server computer 206 sending an appropriate electronic mail message to the supervisor. In other embodiments, the same may be accomplished by the loyalty data server computer 206 adding an item concerning the claim file to the supervisor's work queue. Either of these may include making available to the supervisor a hyperlink that points to the claim file.

In some embodiments, the responses to the customer satisfaction surveys may also be used in appraising claim handlers' job performance. At 614, the loyalty data server computer 206 collates the customer responses to the surveys. For example, the loyalty data server computer 206 may aggregate all interim survey responses that fall in the same category with respect to the degree of customer satisfaction with the handling of the claim. The aggregation of the responses may be on a question-by-question and/or claim-by-claim basis. The same may be done with respect to final survey responses. The response data for interim and final surveys may, but need not, be combined.

Figure 7:
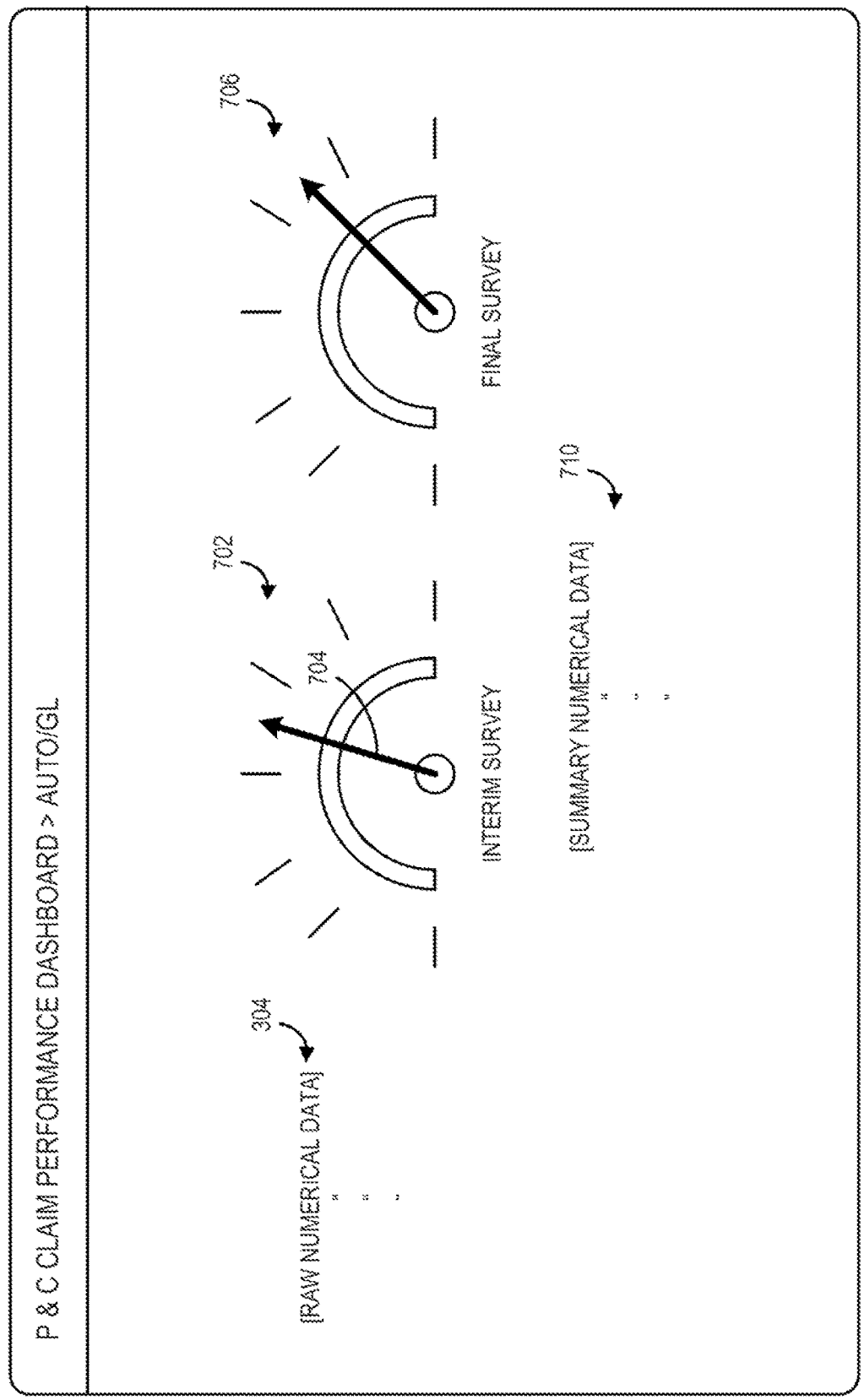
FIG. 7 shows a "dashboard" screen display that may be provided by the loyalty data server computer of FIG. 3.

At 614, the loyalty data server computer 206 may also perform various statistical analyses with respect to the survey response data. For example, the loyalty data server computer 206 may generate analyses which trace trends (step 618) in the survey response data, and/or which aggregate the survey response data by period of time (e.g., daily, weekly, monthly, quarterly and/or annually), by claim-handling office, by individual claim handler, by work group, etc., by type of claim, by line of insurance, etc. Other analyses may provide averages of customer satisfaction ratings, standard deviations, etc. Based, for example, on these analyses and/or aggregations, the loyalty data server computer 206 may generate (step 616) and make available to some or all insurance company employees (via the computer system 100 and/or terminal components thereof, as referred to above) one or more graphical displays that reflect the data, the aggregations thereof and/or the analyses thereof. FIG. 7 shows an example of one such display, provided in a so-called "dashboard" format.

Referring to FIG. 7, one display element 702 is in a "dial" format, and illustrates an average customer satisfaction level indicated by customer responses to interim surveys for a certain type of claim. It will be noted that the dial display element 702 includes an "arrow" element 704 that is displayed against a backdrop of circularly arranged gradations to graphically present the average customer satisfaction data.

The dashboard display of FIG. 7 also includes another display element 706, which is also a "dial" type element in the same format as display element 702. Dial display element 706 may be used to present an average customer satisfaction level indicated by customer responses to final surveys for the same type of claim. Other portions of the dashboard display, schematically represented at 708 and 710 may numerically present data or results of data analyses, collated or generated by the loyalty data server computer 206.

The format of the customer survey response display or displays made available by the loyalty data server computer 206 may vary from that which is shown in FIG. 7. For example, other and/or additional types of graphical elements may be presented and/or the arrangement of the various elements within the screen display may be different. An over-all presentation in a format other than a "dashboard" may be provided.

In some embodiments, the loyalty data server computer 206 may generate a separate dashboard display for each type of claim. In addition or alternatively, the loyalty data server computer 206 may generate two or more dashboard displays—each displaying different results of statistical analysis of survey responses—for a single type of claim. In some embodiments, the loyalty data server computer 206 may provide a navigation screen display (not shown) to allow users to navigate among various dashboard displays of survey results. In some embodiments, a dashboard display may also be a navigation tool. For example, a user may be permitted to "double click" on a display element (e.g., a dial display) in the dashboard display, and in response the computer system 100 may provide another display (not shown) showing a breakdown of information summarized in the display element. In this way, the user may be permitted to "drill down" into the customer satisfaction data generated in the computer system 100.

The loyalty data server computer 206 may also analyze survey responses to determine effects of remedial action following negative responses to interim surveys. For example, the loyalty data server computer 206 may examine final survey results for claim files in which remedial action followed a negative response to an interim survey, in order to determine whether and/or to what extent the remedial action resulted in improved customer satisfaction and/or customer loyalty.

Further, as indicated at 620 in FIG. 6, the loyalty data server computer 206 may generate and make available various reports. These reports may reflect the claim handling performance and trends therein as indicated by the customer survey response data. The reports may be in pre-determined formats, or in formats prescribed on demand by authorized employees. The reports may summarize all available customer response data or may present subsets of the customer response data by type of claim, line of business, geographical area, etc.

At 622 in FIG. 6, the loyalty data server computer 206 may identify claimants who, by their responses to the final surveys, have evidenced a feeling of loyalty toward the insurance company that operates the computer system 100. This may be done, for example, on the basis of the claimants indicating a high degree of satisfaction with the handling of their claim, and/or based on the claimants indicating that they would recommend the insurance company to friends, relatives, business associates, etc. In addition or alternatively, the loyalty data server computer 206 may identify loyal claimants on the basis of their responses to interim surveys. The claimants may or may not be current policy holders with the insurance company. Note that according to some embodiments, final survey results may be used to identify customers as "potential-promoters" of the insurance entity. In this case, those customers might be asked for permission to include information about them in testimonial marketing messages.

At 624, the loyalty data server computer 206 may forward, to the selling proposition server computer 208, data that identifies the loyal claimants referred to in connection with step 622. The selling proposition server computer 208 might be associated with, for example, a sales or distribution partner platform.

Figure 8:
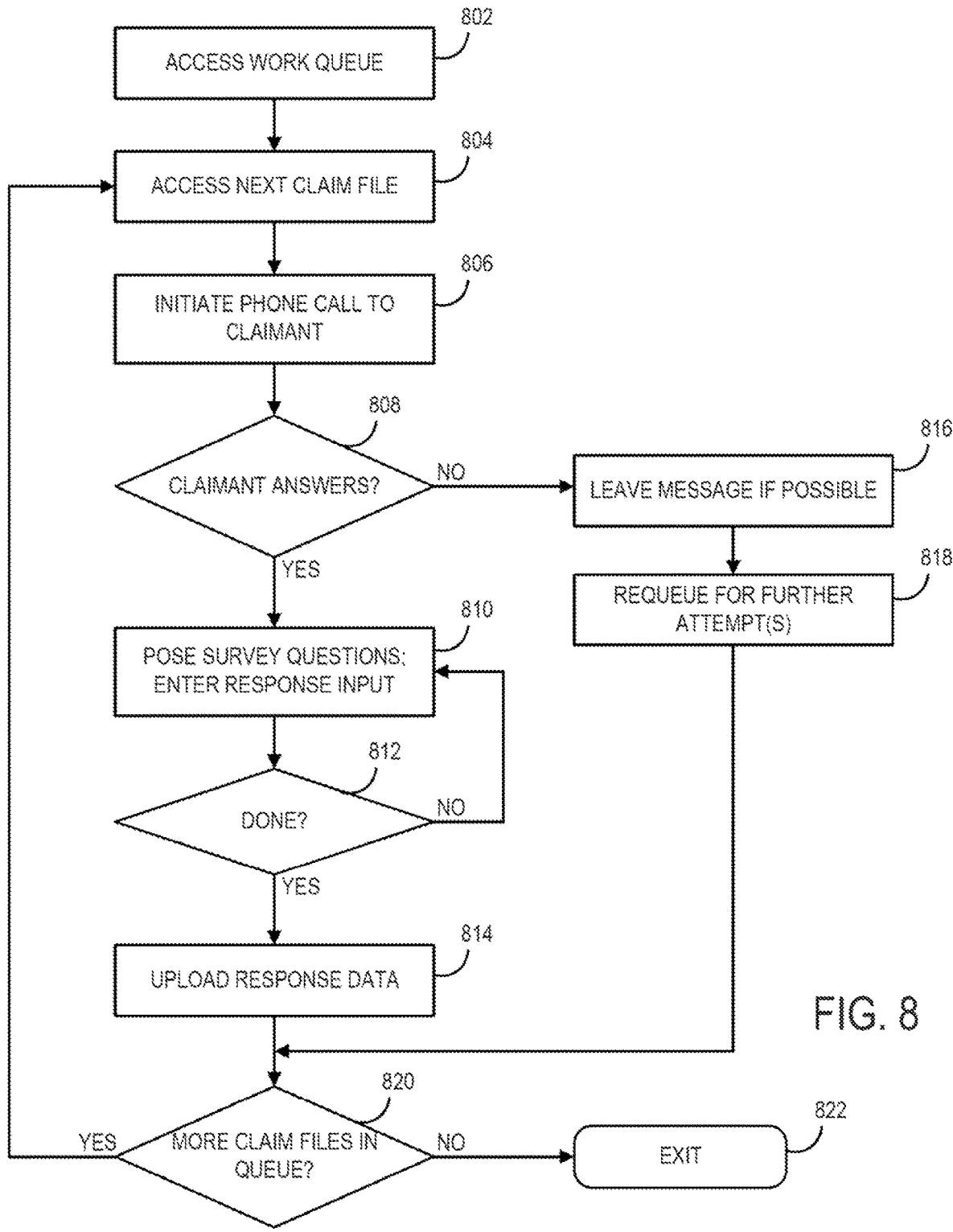
FIG. 8 is a flow chart that illustrates a process that may be performed by the survey employee terminal of FIG. 4.

FIG. 8 is a flow chart that illustrates a process that may be performed by/with a typical one of the survey terminals 106.

At 802 in FIG. 8, the survey employee operates his/her survey terminal 106 to access his/her work queue. At 804, the survey employee operates the survey terminal 106 to access the next/first claim file in the work queue. This may occur, for example, by the survey employee "clicking" on the first entry in the work queue, assuming that the first entry is a hyperlink that points to the claim file (or extract) in question.

At 806 in FIG. 8, the survey employee may use the survey terminal 106 to initiate a telephone call to the claimant for the claim file accessed at 804. For example, the accessed claim file, or extract, may include the claimant's telephone number in a pre-determined data field. The survey terminal 106 may present a graphical user interface (GUI; not shown) to the survey employee. The GUI may include a virtual "start call" button or the like that the survey employee may "click" in order to launch a telephone call via the survey terminal 106 to the claimant's telephone number.

Following 806 in the process of FIG. 8, there is a decision block 808. At decision block 808, it is determined whether the claimant answers the telephone call placed at 806. If so, then block 810 follows decision block 808. At 810, with the claimant's consent, the survey employee proceeds to pose the survey questions to the claimant. In some embodiments, prior to posing the questions, the survey employee obtains the claimant's consent to have his/her voice recorded as part of the survey. From previous discussion it will be understood that the survey may be an "interim" survey to be administered while the claim remains open, or a "final" survey to be administered after the claim has been resolved.

In some embodiments, the interim survey may be quite brief. For example, the initial question may be open-ended, such as asking the claimant how his/her over-all claim experience is going so far. The survey employee may judge whether the claimant's response is positive, neutral or negative and may ask different follow-up questions accordingly. The survey employee may also interact with the survey terminal GUI to provide input to the survey terminal 106 (and thereby to the computer system 100) as to whether the claimant's response to the initial question is positive, neutral or negative.

In the case of a positive response to the initial question, the survey employee may follow up by asking the claimant whether there was something specific that made the claimant feel positive about the claim experience. In some embodiments, the survey employee may determine a category for the claimant's response to the follow-up question (e.g., among categories presented to the survey employee via the survey terminal GUI) and may provide data entry accordingly into the GUI.

In the case of a neutral response, the survey employee's follow-up question may ask the claimant if there is something that the insurance company could do differently to provide better service. Depending on the claimant's response, the survey employee may operate the survey terminal 106 flag the claim file for remedial action. In addition or alternatively, the survey employee may provide data entry into the survey terminal 106 to indicate a category for the claimant's response to the follow-up question, and/or may provide a text/narrative description of the claimant's response.

In the case of a negative response from the claimant, the survey employee may acknowledge the claimant's dissatisfaction, and may follow up by asking if there is something specific that the insurance company could do better to improve its service to the claimant. Preferably, the survey employee would operate the survey terminal 106 to flag the claim file for remedial action. Alternatively, the claim file may automatically be flagged for remedial action simply by the survey employee indicating that the claimant's response to the initial question was negative. In addition, the survey employee may operate the survey terminal 106 to provide text/narrative/categorization or other data entry in order to input the claimant's response into the survey terminal 106.

The interim survey may close with two more questions, namely asking the claimant to rate his/her experience on a scale of 0-10, and asking for the claimant's e-mail address (if not already in the claim file). In either or both cases the survey employee may enter the claimant's response into the survey terminal 106. The survey employee may also ask the claimant whether he/she would be willing to be contacted for a subsequent survey at a later stage in the claim process.

A final survey script may also be rather brief. The final survey may begin with the survey employee asking the claimant to rate, on a scale of 0-10, how likely it is, based on the claimant's experience with the recently closed claim, that the claimant would recommend the insurance company to a friend or relative or business associate. In other questions, the survey employee may ask the claimant what he/she would tell other people about the insurance company, and/or may ask about specific aspects of handling the type of claim in question. Also, in cases where the claimant is not currently a policy holder, the survey employee may ask the claimant to rate, on a scale of 0-10, how likely the claimant is to consider buying insurance coverage from the insurance company.

With respect to all of these questions, the survey employee may operate the survey terminal 106 to enter data that reflects the claimant's responses.

Where either of the rating questions elicits a high score from the claimant, the computer system 100 (e.g., via the loyalty data server computer 206) may classify the claimant as evidencing loyalty to the insurance company, and thus suitable for generation of a selling proposition from the selling proposition server computer 208.

With respect to either or both of the interim survey and the final survey, step 810 may include recording at least part of the telephone call, including either or both of the claimant's voice and the survey employee's voice. For both the interim and final surveys, the survey design may be such that the survey can typically be completed in two to three minutes.

Decision block 812 in FIG. 8 indicates that the survey employee continues with the survey until it is determined that the survey is complete. Thus, if the survey is not complete, the process loops back from decision block 812 to block 810. But once the survey is determined to be complete, the process of FIG. 8 advances from decision block 812 to block 814. At block 814, the survey terminal uploads the data representing the survey responses to the loyalty data server computer 206. (Alternatively, this may later be done in a batch mode with data for the surveys for other claim files.) The uploaded data may include both the information entered by the survey employee and also data that represents the sound recording of the survey telephone call.

Considering again decision block 808 in FIG. 8, if it is determined at that point that the claimant has not answered, then the process of FIG. 8 may branch from decision block 808 to block 816. At block 816, the survey employee may, if possible, leave a voice message for the claimant. For example, the survey employee may indicate in the message that he/she will attempt at a later time to contact the claimant, or ask the claimant to call back, or ask the claimant to send an electronic mail message as to when to call again. Further, at 818, the survey employee (or the survey terminal acting automatically) may requeue the claim file for one or more further attempts to reach the claimant by telephone. In some embodiments, the number of permissible attempts to reach the claimant may be limited, and the number of attempts made may be kept track of, so that the claim file is not requeued when the limited number of attempts has been reached. Note that the actions described in connection with 816 and 818 are optional and do not need to be included in any of the embodiments described herein.

Figure 9:
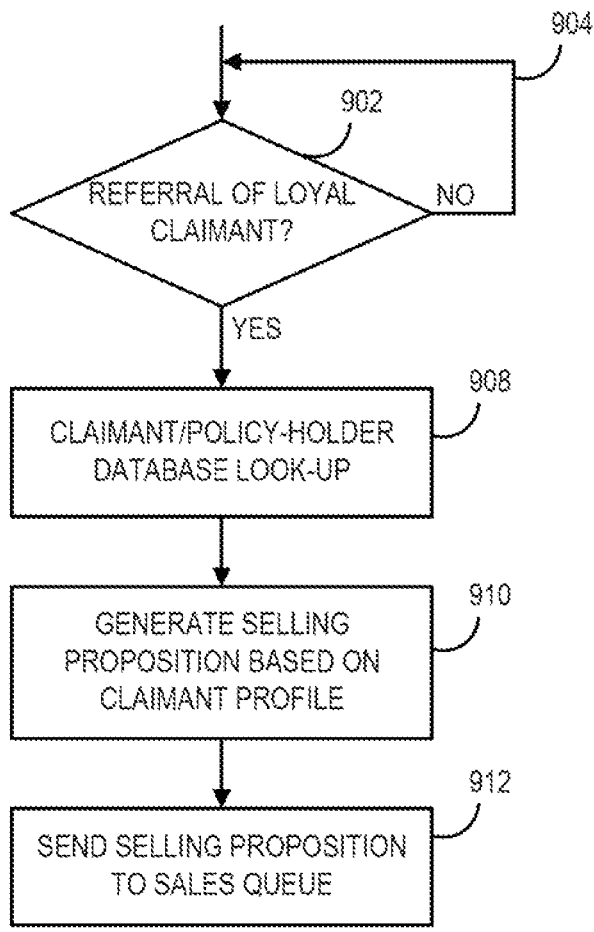
FIG. 9 is a flow chart that illustrates a process that may be performed by the selling proposition server computer of FIG. 5.

Following either 818 or 814, as the case may be, is a decision block 820. At 820 it is determined whether there are any more claim files in the survey employees' work queue. If not, the process exits (822). Otherwise, the process loops back from decision block 820 to block 804 for the purpose of accessing the next claim file in the work queue. FIG. 9 is a flow chart that illustrates a process that may be performed by the selling proposition server computer 208. At 902 in FIG. 9, the selling proposition server computer 208 determines whether it has received, from the loyalty data server computer 206, a referral of a loyal or potentially loyal claimant, as identified through the final survey process described above. The referrals of such claimants to the selling proposition server computer 208 from the loyalty data server computer 206 may be made one-by-one as the loyal claimants are identified and/or in batches.

As indicated by branch 904 from decision block 902, the process of FIG. 9 may idle until such a referral is received by the selling proposition server computer 208. However, as indicated by branch 906 from decision block 902, when such a referral is received, the process of FIG. 9 may advance from decision block 902 to block 908.

At block 908, and based on the information included in the referral that identifies the claimant, the selling proposition server computer 208 may engage in a data look-up via, e.g., the policy holder data management server computer 202 and/or via the claim data management server computer 204, to obtain more information about the claimant who has been identified as loyal. From the data look-up, the selling proposition server computer 208 may obtain information concerning the claimant such as whether the claimant already is a policy holder (although this fact may alternatively be included already in the referral) and if so under what kind or kinds of policies, for how long, with what specific insurance products, with what policy limits, etc. Further, the selling proposition server computer 208 may obtain by the data look-up at least some demographic information concerning the claimant, including for example his/her age, gender, home address zip code, whether he/she lives in a single family residence or a multiple unit building, income level, marital status, composition of household, types of vehicles insured (if any), employment status, etc.

At block 910, and based on information obtained by the selling proposition server computer 208 at 908, the selling proposition server computer 208 may generate a selling proposition for the claimant. The selling proposition may include one or more insurance policies or additional policies that the insurance company may wish to offer to the claimant, in view of the claimant's demographic attributes, other insurance coverages, history with the insurance company, etc. The selling proposition server computer 208 may generate the selling proposition in accordance with decision rules that have been pre-programmed into the selling proposition server computer 208.

At block 912, the selling proposition server computer 208 may route the selling proposition to the work queue of a sales employee of the insurance company or with an affiliate of the insurance company. Thus the selling proposition may be routed to a sales terminal 120 (FIG. 1) or otherwise brought to the attention of the sales employee. The sales employee may, in turn, present the selling proposition to the claimant. Note that sales employee may be associated with an insurance company or any other party (e.g., to offer products or services unrelated to insurance).

In some embodiments, claimants who have evidenced loyalty may be asked to permit the insurance company to send e-mail messages to the claimants' friends and family. The e-mail messages may inform the recipients of the claimant's positive experience with the insurance company, and may provide to the recipients, or invite the recipients to ask for, information concerning the insurance company's products.

The usefulness of the computer system 100 may be significantly enhanced by the above-noted practice of sound-recording and centrally storing the claimants' responses to the surveys. This may allow supervisors, claim handlers, sales employees and others to audibly reproduce the claimants' responses via their terminals. In this way, the insurance company employees may get a nuanced feeling for the claimants' wishes and attitudes by hearing the claimants' actual words and tone of voice. For this purpose, at least some of the terminals referred to herein may have audible sound reproduction capabilities. The computer system 100, as described herein, may enable the insurance company to engender improved customer loyalty, and increased sales, by improving the insurance company's claim handling performance.

The database storage module 102 and/or the loyalty data server computer 206, as the case may be, may store data entered by the survey employees and data representing sound recordings of the surveys together in one database or in separate (e.g., linked) databases and/or in separate data storage devices.

As an alternative to conducting the interim and final surveys by telephone, either or both may be conducted by electronic mail (e.g., by providing the claimant with a link to a suitable webpage). In some embodiments, when a survey is conducted by electronic mail, the computer system 100 (e.g., the loyalty data server computer 206) may use artificial intelligence to interpret narrative responses from the claimants to determine whether the responses are positive, neutral or negative.

Figure 10:
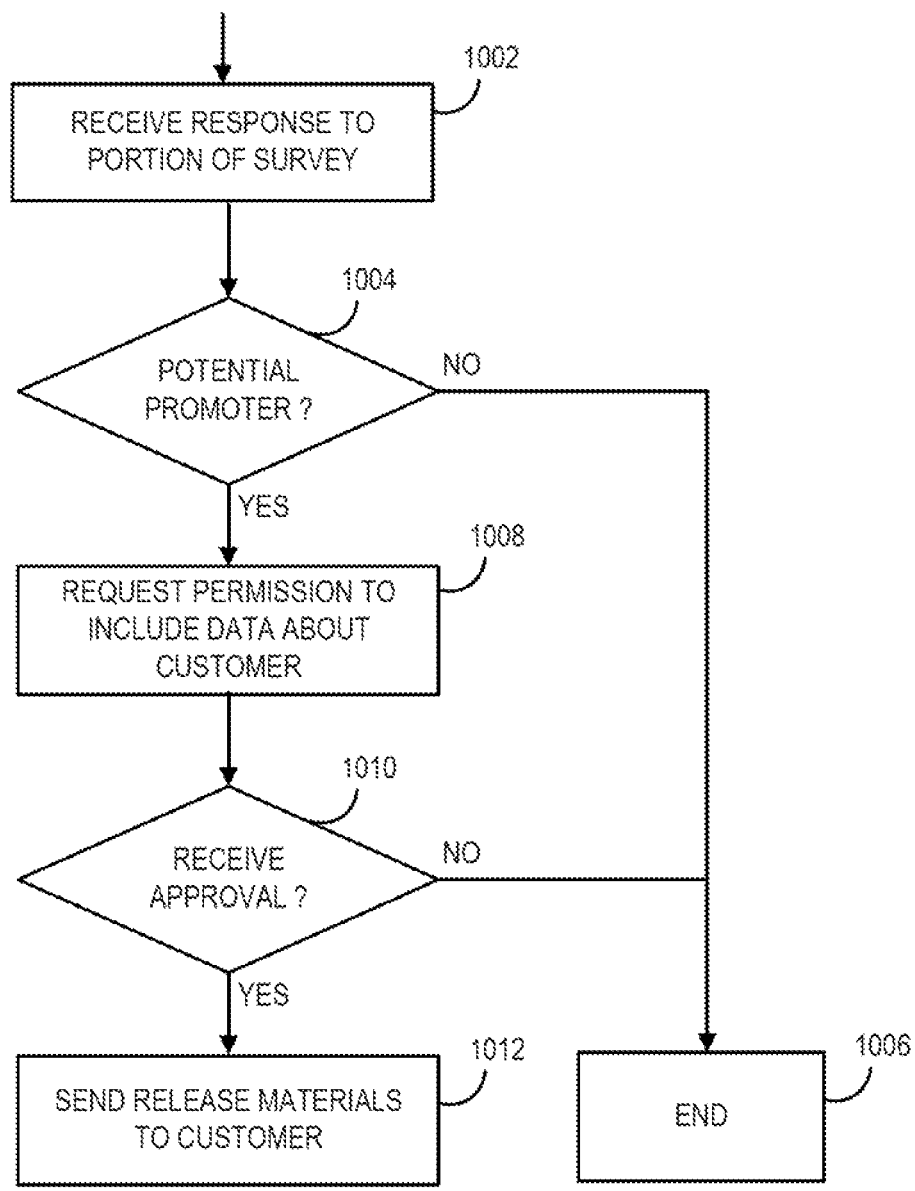
FIG. 10 is a flow chart that illustrates a process that may be performed by any of the devices described herein.
Figure 15:
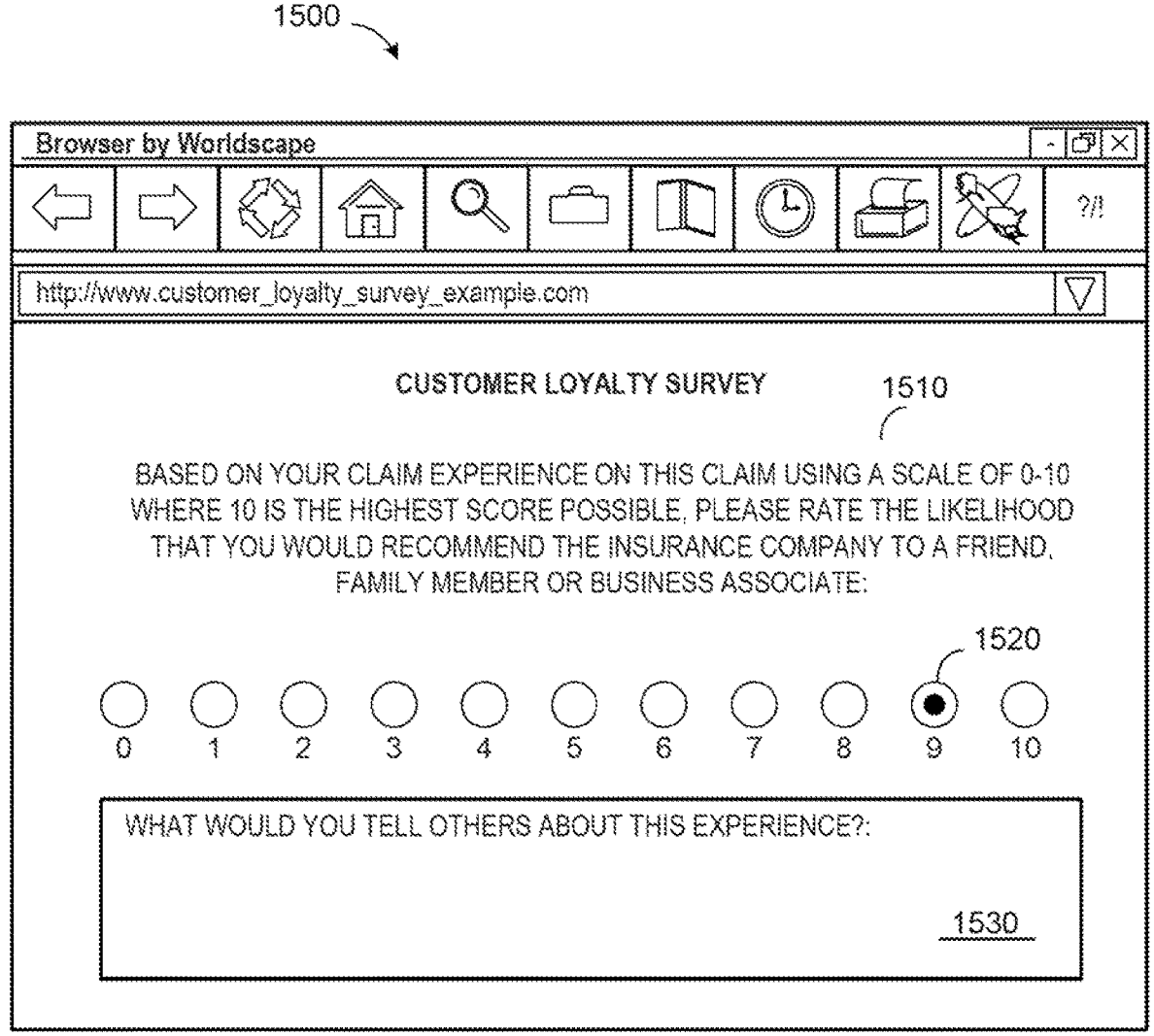
FIG. 15 is display illustrating a portion of a customer loyalty survey that might be displayed to a customer in accordance with any of the embodiments described herein.

Any of the systems or devices herein may further be configured to facilitate the generation of testimonial marketing messages. For example, FIG. 10 is a flow chart that illustrates a process that may be performed by any of the devices described herein. At 1002, a portion of a customer feedback response to a portion of a loyalty survey may be received (e.g., received by a data acquisition processor associated with an insurance company or a third party vendor of the insurance company). The portion of the customer feedback may be received after a notice of an insurance claim associated with a customer is received (e.g., and before or after the claim is resolved). Note that the feedback might be associated with any of the surveys described herein (including interim and/or final surveys or questionnaires). By way of example, FIG. 15 is display 1500 illustrating a portion of a customer loyalty survey that might be displayed to a customer in accordance with any of the embodiments described herein. The display 1500 includes a question 1510 asking the customer to rate his or her experience using a scale from 0 to 10 (with 10 being the highest score possible). The display 1500 further includes an answer portion 1520 where the customer can provide his or her answer and a comment section 1530 that can be used to provide additional information, such as what the customer might tell others about his or her experience with the insurance provider.

Referring again to FIG. 10, the portion of the customer feedback response may be automatically classified (e.g., by a data acquisition processor) in one of two categories, the two categories being a "potential-promoter category" and a "non-potential-promoter" category. This might include assigning a customer loyalty index value to the portion, wherein the portion is classified as being in the potential-promoter category when the customer loyalty index value exceeds a pre-determined threshold value. In the example of FIG. 15, customer answers might be categorized as follows:

0-6 potential detractors
7-8 passive customers
9-10 potential promoters with both "potential detractors" and "passive customers" being considered as falling into the "non-potential promoter" category. That is, a customer who was highly satisfied with his or her experience may be much more inclined to let his or her information be used in a testimonial marketing message. According to some embodiments, the customer feedback response may further be stored in a claim file and/or provided to a supervisor to facilitate an appropriate handling of the customer's claim. For example, alerts might be transmitted to supervisors on an hourly basis after customer feedback responses are received that meet one or more pre-determined conditions (e.g., customers who provide an answer below a threshold value).

When the portion of the customer feedback response is classified as being in the potential-promoter category at 1004, it may be automatically arranged at 1008 for the customer to respond to a supplemental portion of the loyalty survey before the survey is concluded. The supplemental portion may, for example, include a question asking for the customer's permission to include information about the customer in a "testimonial marketing message." As used herein, the phrase "testimonial marketing message" might refer to, for example, a web advertisement, an email message, text information, image information, video information, audio information, and/or marketing materials (e.g., a brochure or pamphlet). Note that testimonial marketing messages may be provided to potential customers who are unknown to the responding customer (e.g., people other than the responding customer's friends, family, and business acquaintances). According to some embodiments, testimonial marketing messages may be provided to potential customers who share one or more characteristics with the responding customers (e.g., who belong to the same organization or have filed similar types of insurance claims in the past). Moreover, according to some embodiments the testimonial marketing message may comprise audio information provided by the responding customer that is played for or otherwise transmitted to the potential customers.

According to some embodiments, a testimonial marketing message may include the distribution of information to members of social networking web sites. For exemplary purposes, such sites/networks may include ebay.com, Facebook.com, LinkedIn.com, AngiesList.com, Twitter.com, Blogger.com, MySpace.com, Friendster.com, and other similar sites. In such cases, a testimonial marketing message might represent a social network post (e.g., "Sandra Jones rated her insurance experience a 9 out of 10!") or a social network approval indication (e.g., a Facebook "like" indication).

Figure 16:
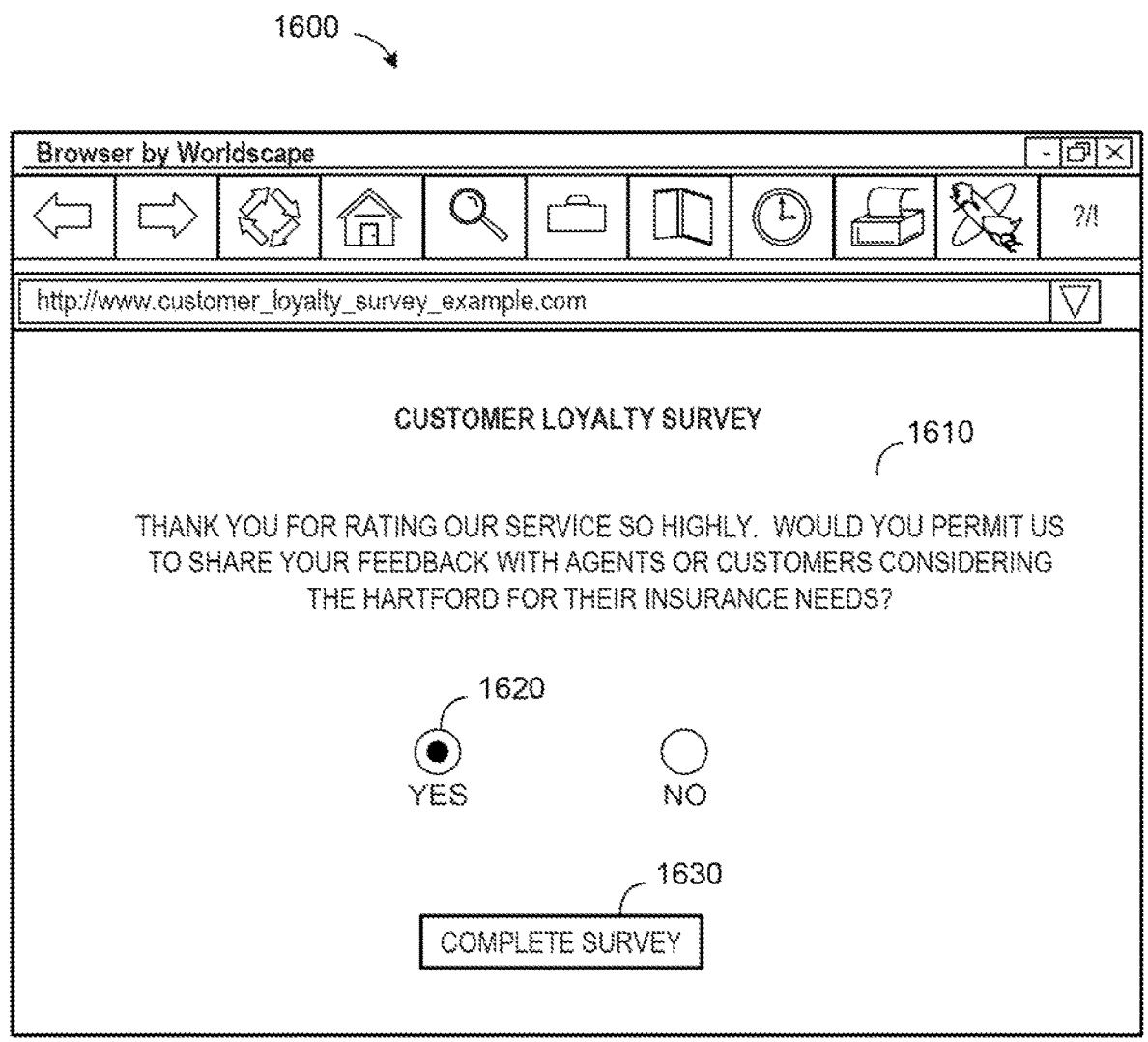
FIG. 16 is display illustrating a supplemental portion of a customer loyalty survey that might be displayed to a customer in accordance with any of the embodiments described herein.

FIG. 16 is display 1600 illustrating a supplemental portion of a customer loyalty survey that might be displayed to a customer at step 1008 in accordance with any of the embodiments described herein. The display 1600 includes a question 1610 asking for the customer's permission to have his or her information (e.g., feedback comments) shared with agents or customers who may be considering the insurance company for their insurance needs. The display 1600 further includes a customer response input 1620 (e.g., where he or she can respond with a "yes" or "no" answer) and a "complete survey" icon 1630 that may be used by the customer to conclude the survey.

The information about the customer that could be used in a testimonial marketing message might include, for example, the customer's name, a customer score (e.g., a rating from 0 to 10), a customer comment, a customer agent, and/or social network information about the customer. Using some or all of this information in a testimonial marketing message might require that the customer sign a release or similar document granting his or her permission to do so. Referring again to FIG. 10, if the customer provides initial approval to be included at step 1010, a release form may be automatically transmitted to the customer at 1012 (e.g., via an email message).

Figure 17:
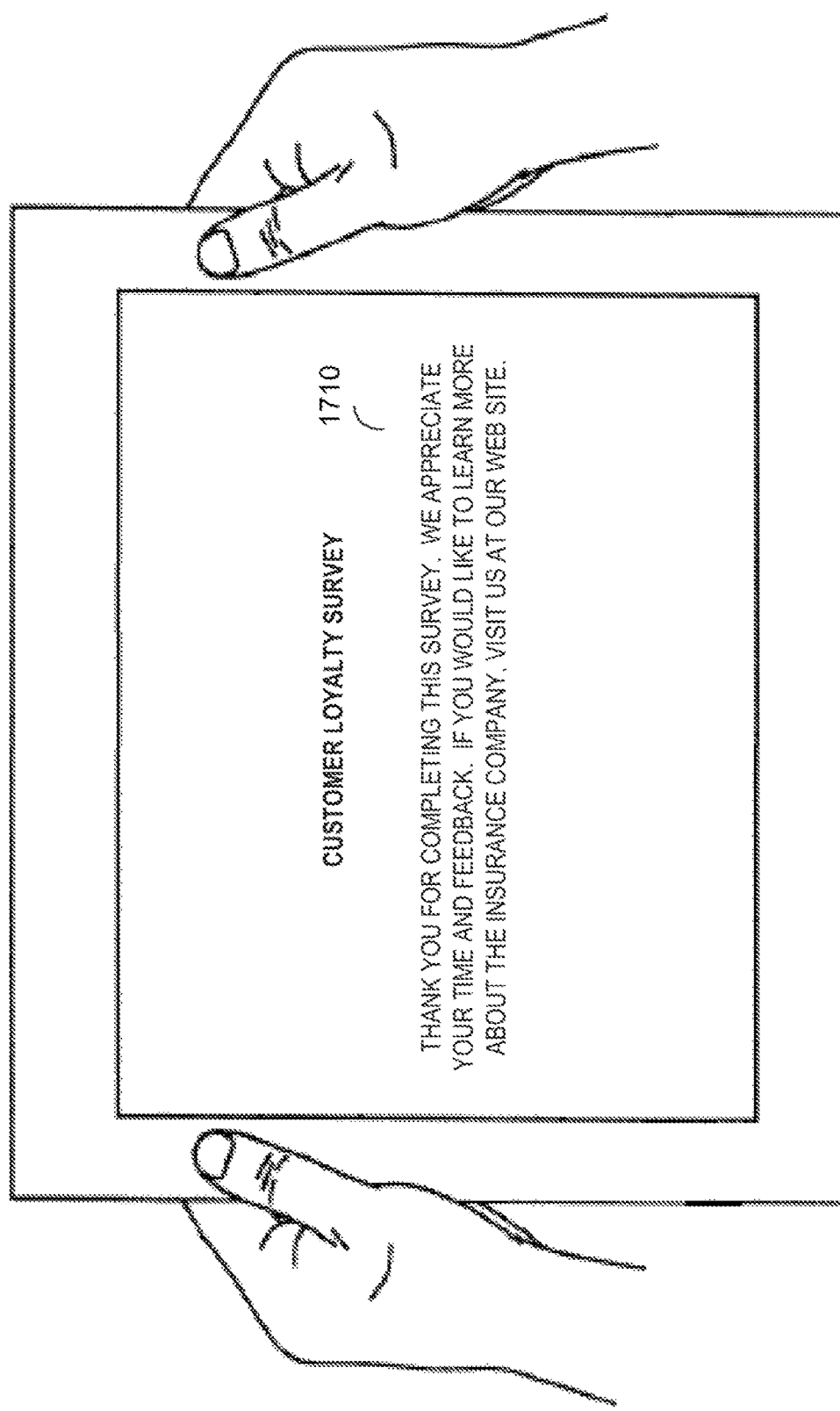
FIG. 17 is display illustrating a portion of a survey conclusion that might be displayed to a customer in accordance with any of the embodiments described herein.

When the portion of the customer feedback response was classified at 1004 as being in the non-potential-promoter category, it may be automatically arranged for the loyalty survey to be concluded at step 1006 without having the customer respond to the supplemental portion of the loyalty survey. For example, FIG. 17 is display 1700 illustrating a portion of a survey conclusion message 1710 that might be displayed to a customer in accordance with any of the embodiments described herein. Such a display 1700 might also be provided to potential-promoter customers who declined to participate in a testimonial marketing program at step 1010.

Up to this point, most if not all of the employees mentioned herein have been referred to as insurance company employees. Alternatively, however, the insurance company may contract out some of the activities described herein. For example, the insurance company may contract out the surveys, so that the "survey employees" may be employed by an outside vendor, and the survey terminals 106 (FIGS. 1 and 2) may be operated by the outside vendor. Further note that any of the embodiments described herein may be associated with any type of interactions between a company and a customer (e.g., embodiments are not limited to interactions associated with insurance claims).

In some embodiments, insurance company employees may also be surveyed concerning claim processes. For example, both claimants and claim handling employees may be surveyed as to performance of outside vendors retained by the insurance company. In some embodiments, the loyalty data server computer 206 (and/or the survey terminals 106) may include a capability for translating recorded voice files into text files. The resulting text files may be stored in the computer system 100 in association with the corresponding claim files, and may be made available to users of the computer system 100 in addition to or instead of the recorded voice files.

In some embodiments described herein, customer feedback information is used by an insurance entity to resolve potential problems with customers and/or to determine a level of satisfaction associated with insurance claims processing. According to some embodiments, other parties might make use of customer feedback information.

Figure 11:
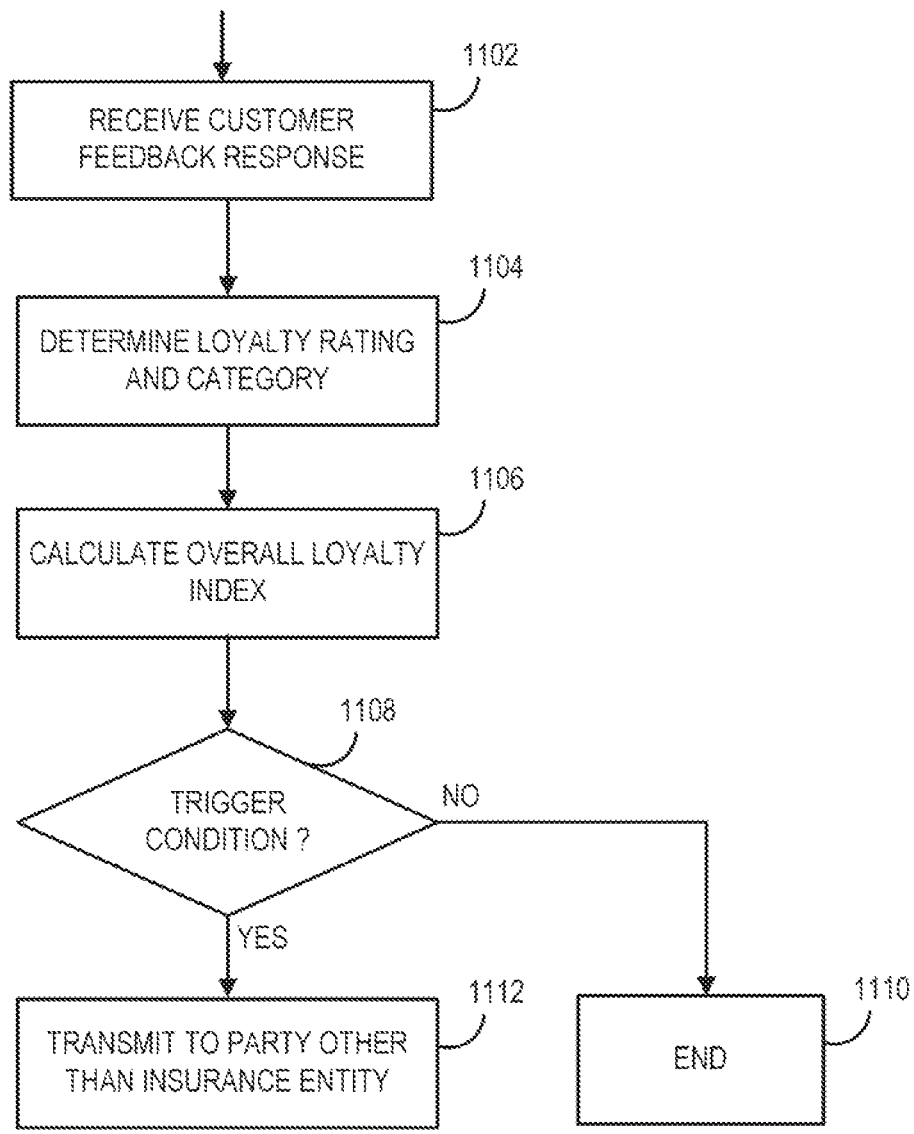
FIG. 11 is a flow chart that illustrates a process that may be performed in connection with customer feedback information in accordance with any of the embodiments described herein.

FIG. 11 is a flow chart that illustrates a process that may be performed in connection with customer feedback information in accordance with any of the embodiments described herein. At step 1102, customer feedback response may be received. For example, a data acquisition processor might receive a customer feedback response to a loyalty survey (e.g., such as the survey illustrated in FIG. 14), the customer feedback being received after a notice of an insurance claim associated with an insurance entity and a customer is received. Note that the customer feedback response might be received by the data acquisition processor before the claim is resolved or after the claim is resolved. Moreover, the customer might provide the customer feedback response via, for example, a telephone call, a web survey, and/or an email survey.

At step 1104, a loyalty rating may be determined for the customer based on the received customer feedback response. According to some embodiments, the loyalty rating might be a satisfaction score from 0 to 10.

At step 1106, an overall customer loyalty index, associated with a plurality of customers, may be calculated. According to some embodiments, a customer loyalty value may be assigned the customer feedback response, wherein the customer is classified as being in a potential-detractor category when the customer loyalty value is below first threshold value and the customer is classified as being in a potential-promoter category when the customer loyalty value is above pre-determined threshold value. For example, customers associated with a customer loyalty value of 6 or lower might be classified as being "potential-detractors" while customers associated with a customer loyalty value of 9 or higher are considered "potential-promoters." The customer loyalty index may be calculated for a plurality of customers, and might be based on an overall amount of customers in the potential-promoter category reduced by an overall amount of customers in the potential-detractor category. For example, if 60% of customers are potential-promoters while 20% are potential-detractors, an overall customer loyalty index of 40% (60%-20%) might be calculated.

Based on the loyalty rating and/or overall loyalty index, it is determined if a trigger condition is satisfied at step 1108. According to some embodiments, the trigger condition might represent a potential problem that may need to be resolved (e.g., when there is an unusually low loyalty score). According to other embodiments, the trigger condition might represent a potential opportunity to provide additional services (e.g., when there is an unusually positive loyalty score). If no trigger condition is satisfied at step 1108, the process ends at 1110.

If a trigger condition was satisfied at 1108, information associated with the customer may be automatically transmitted to a party other than the insurance entity at step 1112. Note that the information might be transmitted in substantially real time (e.g., within minutes or hours of the feedback response). According to some embodiments, the transmitted information includes a customer name, a customer score, a customer comment, a customer agent, social network information about the customer, a claim identifier, a claim status, and/or customer loyalty index data.

The "party other than the insurance entity" might be, according to some embodiments, associated with one or more "third party administrators." As used herein, the phrase "third party administrator" may refer to, for example, a party who processes insurance claims for another entity. That is, an independent third party administrator might perform tasks traditionally handled by an insurance company or an employer and might benefit from the receipt of customer feedback information. The information received by the third party administrator, such as one or more service alerts, might be used to resolve potential issues with a claim (e.g., by contacting an insured to verify that his or her claim is being handled properly) and/or to assess the performance of the third party administrator. For example, information may be exchanged with the party other than the insurance entity to determine a resolution status associated with the customer feedback response (e.g., an indication that a service alert has been resolved and the insured is now satisfied with the performance of the third party administrator).

Figure 12:
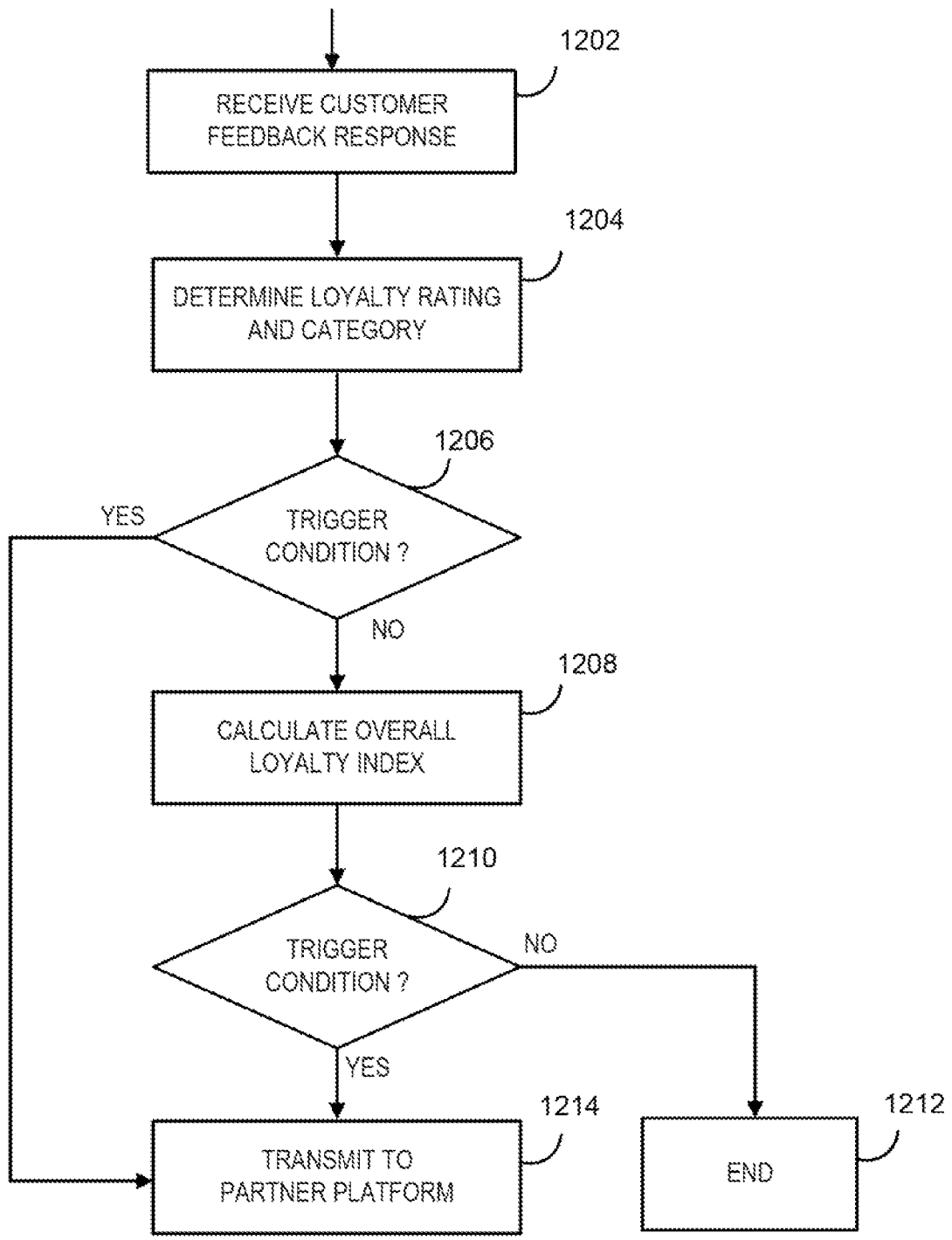
FIG. 12 is a flow chart that illustrates a process that may be performed in connection with customer feedback information in accordance with any of the embodiments described herein.

FIG. 12 is a flow chart that illustrates a process that may be performed in connection with customer feedback information in accordance with any of the embodiments described herein. At step 1202, customer feedback response may be received. For example, a data acquisition processor might receive a customer feedback response to a loyalty survey (e.g., such as the survey illustrated in FIG. 15), the customer feedback being received after a notice of an insurance claim associated with an insurance entity and a customer is received. Note that the customer feedback response might be received by the data acquisition processor before the claim is resolved or after the claim is resolved. Moreover, the customer might provide the customer feedback response via, for example, a telephone call, a web survey, and/or an email survey.

At step 1204, a loyalty rating may be determined for the customer based on the received customer feedback response. According to some embodiments, the loyalty rating might be a satisfaction score from 0 to 10. Based on the loyalty rating, it is determined if a trigger condition is satisfied at step 1206. According to some embodiments, the trigger condition might represent a potential problem that needs to be resolved (e.g., when there is an unusually low loyalty score). According to other embodiments, the trigger condition might represent a potential opportunity to provide additional products or services (e.g., when there is an unusually positive loyalty score). If the trigger at 1206 is detected, information may be transmitted to the partner platform at 1214. If no trigger condition is satisfied at step 1206, the process continues at step 1208.

At step 1208, an overall customer loyalty index, associated with a plurality of customers, may be calculated. According to some embodiments, a customer loyalty value may be assigned the customer feedback response, wherein the customer is classified as being in a potential-detractor category when the customer loyalty value is below first threshold value and the customer is classified as being in a potential-promoter category when the customer loyalty value is above pre-determined threshold value. For example, customers associated with a customer loyalty value of 6 or lower might be classified as being "potential-detractors" while customers associated with a customer loyalty value of 9 or higher are considered "potential-promoters." The customer loyalty index may be calculated for a plurality of customers, and might be based on an overall amount of customers in the potential-promoter category reduced by an overall amount of customers in the potential-detractor category. For example, if 60% of customers are potential-promoters while 20% are potential-detractors, an overall customer loyalty index of 40% (60%–20%) might be calculated.

Based on the overall loyalty index, it is determined if a trigger condition is satisfied at step 1210. According to some embodiments, the trigger condition might represent a potential problem that may need to be resolved (e.g., when there are unusually low loyalty scores). According to other embodiments, the trigger condition might represent a potential opportunity to provide additional services (e.g., when there are unusually positive loyalty scores). If no trigger condition is satisfied at step 1210, the process ends at 1212.

If a trigger condition was satisfied at 1210, information associated with the customer may be automatically transmitted to a partner platform at step 1214. Note that the information might be transmitted in substantially real time (e.g., within minutes or hours of the feedback response). According to some embodiments, the transmitted information includes a customer name, a customer score, a customer comment, a customer agent, social network information about the customer, a claim identifier, a claim status, and/or customer loyalty index data.

The "partner platform" might be, according to some embodiments, associated with one or more "sales or distribution partners." As used herein, the phrase "sales or distribution partner" may refer to, for example, a party who may use the transmitted information to offer additional products and/or services to the customer. According to some embodiments, information may be exchanged with the partner platform to determine a follow-up action associated with the customer feedback response (e.g., to proactively help resolve a service alert). The follow-up action might be associated with, for example, a supervisor alert, a follow-up interaction with the customer, a review process, and/or a marketing activity. Moreover, according to some embodiments, information might be automatically transmitted to an email application, a workflow process, and/or a report generator. Note that as used herein, information might be exchange by transmitting information to, or receiving information from, a partner platform. According to some embodiments, survey scores, potential promoter information, etc., may be shared with a partner platform to help solidify relationships between the partner and customers. Note that the information may be provided on a customer-level basis, partner-level basis, and/or with respect to a particular type or amount of insurance. According to some embodiments, the information shared with a partner, such as an independent insurance agent, does not identify any particular customer (e.g., it might instead indicate that 75% of all customers are potential promoters).

Figure 13:
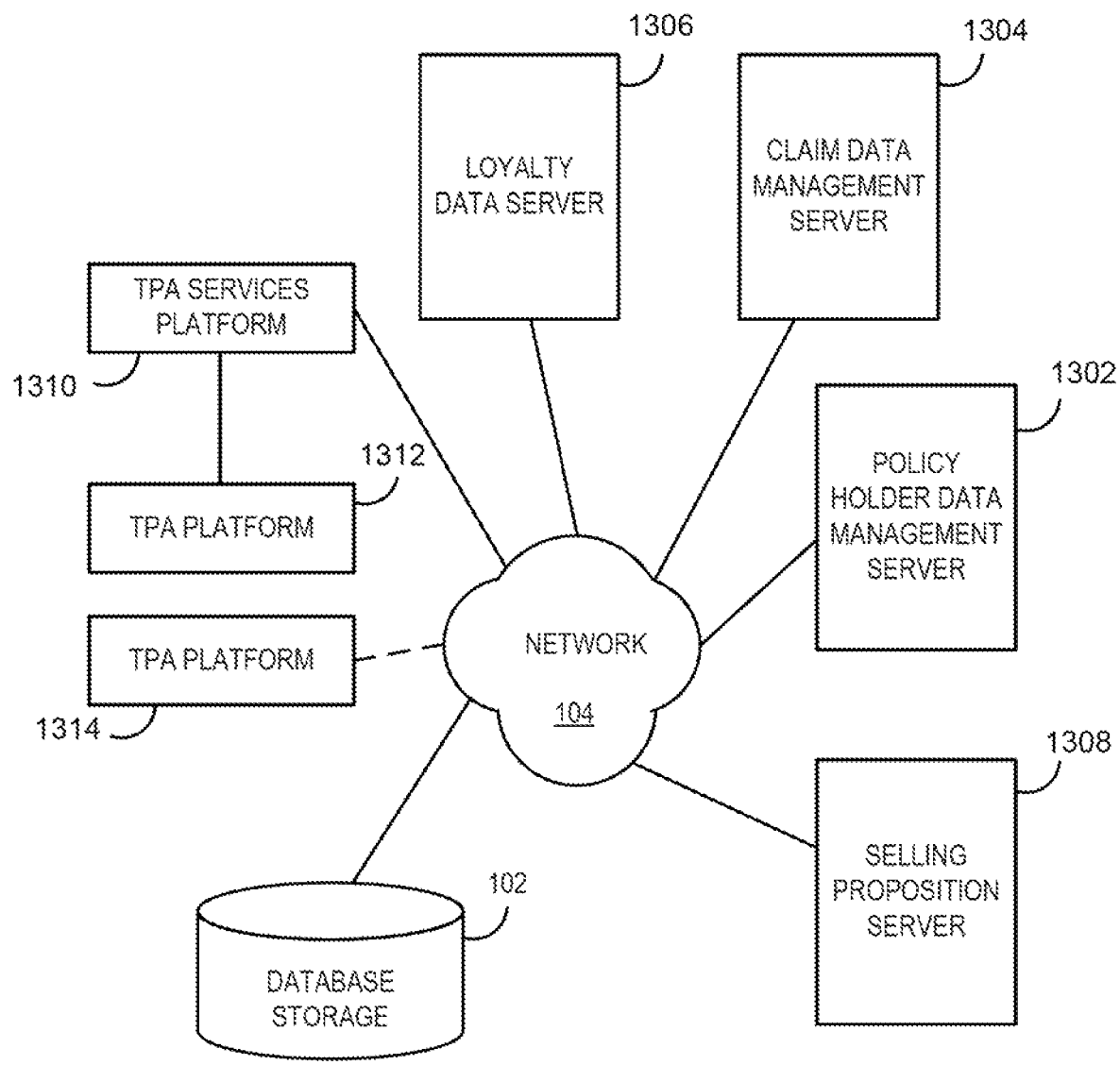
FIG. 13 is a block diagram that provides a representation of aspects of a system including third party administrators.

FIG. 13 is a block diagram that provides a representation of aspects of a system including database storage 102, a data communication network 104, a policy holder data management server computer 1302, and a claim data management server computer 1304. The latter two servers may together constitute some or all of the functionality ascribed above to the data storage module 102 shown in FIG. 1. The policy holder data management server computer 1302 and the claim data management server computer 1304 may both be constituted and operated in a substantially conventional manner. The policy holder data management server computer 1302 may store data concerning policies in force with the insurance company, including names, addresses, etc. of policy holders, types and terms of coverage, policy effective dates, coverage amounts, etc. The claim data management server computer 1304 may store data concerning claims made against the insurance company, includes names and addresses of claimants, date of loss, and all other information accumulated during investigation and settlement/resolution of the claims. Other components of the computer system shown in FIG. 13 may include a loyalty data server computer 1306 and selling proposition server computer 1308.

Further, the computer system of FIG. 13 may include a number of Third Party Administrator ("TPA") platforms 1312, 1314. The TPA platforms 1312, 1314 may receive customer feedback information directly from the network 104 or, according to some embodiments, a TPA platform 1312 might receive customer feedback information via a TPA services platform 1310 (e.g., that communicates with a number of different TPA platforms 1312).

The computer system of FIG. 13 may include other server computers (e.g., one or more billing servers) in addition to the server computers shown in FIG. 13. The functions ascribed to individual server computers herein may in practice be divided up among two or more different computers. Also, the functions shown or described as being performed in separate computers may in practice be combined within a single computer.

In this way, customer feedback information (e.g., both on an individual customer level and an overall TPA level) may be automatically transmitted to a TPA platform 1312 in substantially real time to help identify service strengths and opportunities. For example, the TPA platforms 1312 and/or TPA services platform 1310 may receive copies of survey results and service alerts (e.g., associated with low scores that satisfy one or more trigger conditions) in near real-time in order to effect a service recovery (e.g., helping a third party administrator contact dissatisfied customers early in a claim resolution process to improve service). According to some embodiments, TPA based customer loyalty index scores might be used to score TPA performance and/or to identify areas that may benefit from improvement.

Figure 14:
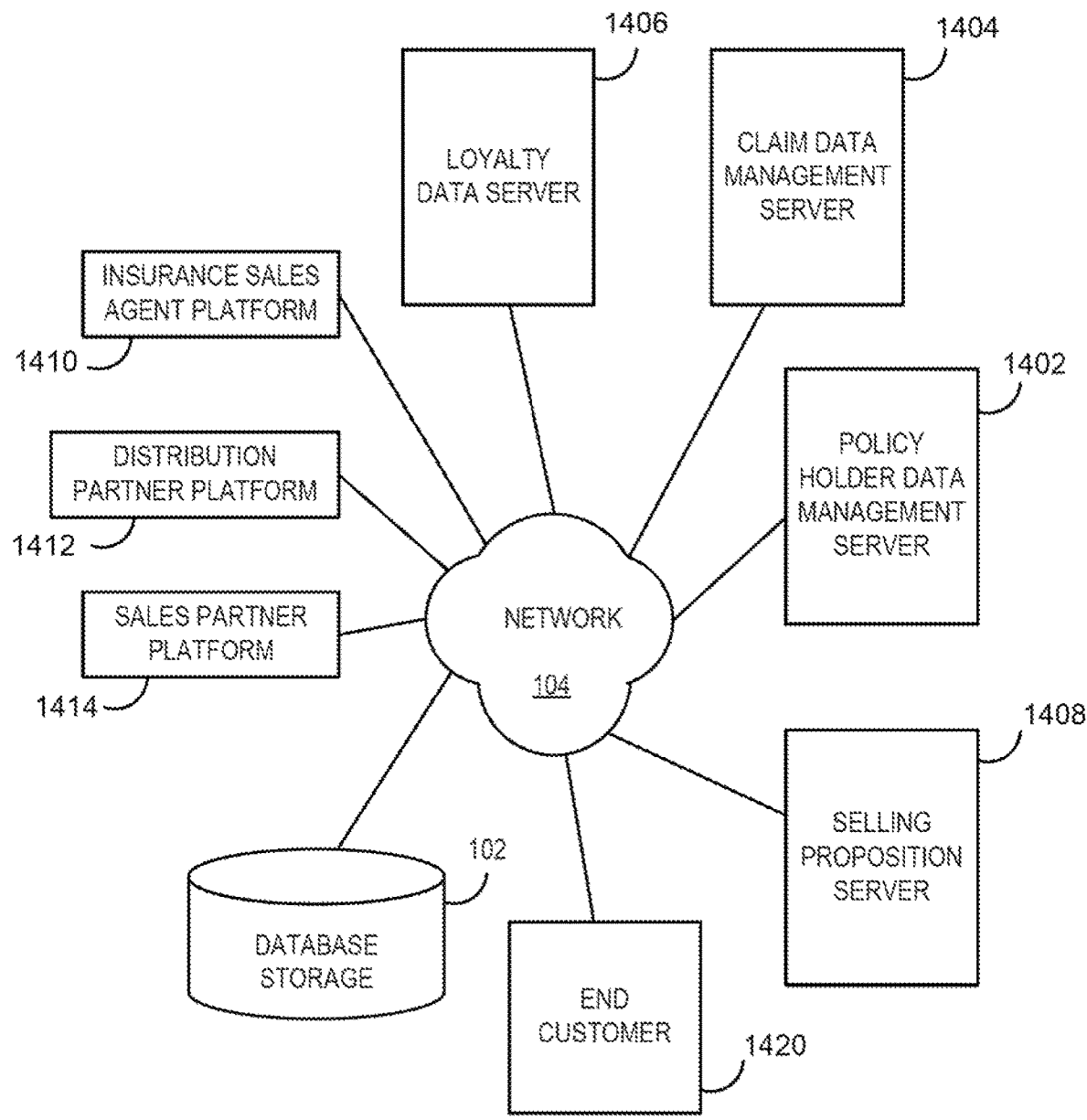
FIG. 14 is a block diagram that provides a representation of aspects of a system that includes other parties according to any of the embodiments described herein.

Note that parties other than third party administrators and the insurance entity itself might benefit from the receipt of customer feedback information. For example, FIG. 14 is a block diagram that provides a representation of aspects of a system including database storage 102, a data communication network 104, a policy holder data management server computer 1402, and a claim data management server computer 1404. The latter two servers may together constitute some or all of the functionality ascribed above to the data storage module 102 shown in FIG. 1. The policy holder data management server computer 1402 and the claim data management server computer 1404 may both be constituted and operated in a substantially conventional manner. The policy holder data management server computer 1402 may store data concerning policies in force with the insurance company, including names, addresses, etc. of policy holders, types and terms of coverage, policy effective dates, coverage amounts, etc. The claim data management server computer 1404 may store data concerning claims made against the insurance company, includes names and addresses of claimants, date of loss, and all other information accumulated during investigation and settlement/resolution of the claims. Other components of the computer system shown in FIG. 14 may include a loyalty data server computer 1406 and selling proposition server computer 1408.

Further, the computer system of FIG. 14 may include a number of insurance sales agent platforms 1410. By providing customer feedback information to an insurance sales agent platform 1410 (e.g., via an email, web site, or any other method), a sales agent may be able to proactively help resolve potential problems and/or take advantage of opportunities that may exist with especially satisfied customers (e.g., by asking the customer to post a recommendation on a social networking web site). Similarly, customer feedback information (including feedback information received before and/or after a claim is resolved) might be transmitted to distribution partner platforms 1412 and/or sales partner platforms 1414. For example, the customer feedback information might be used by the selling proposition server 1408 to identify additional services that might be offered to satisfied customers. In this way, the customer loyalty program may be leveraged as a differentiator in the marketplace because customer loyalty index results can be shared at a high-level with distribution partners and/or agents. Moreover, the system of FIG. 14 may share scores (including individual survey results) and/or service alerts with agents and/or sales partners in real or substantially real time to help resolve problems and/or identify potential sales opportunities. According to some embodiments, the system of FIG. 14 also shares scores, indexes, and/or survey results with an end customer 1420. The end customer 1420 might, for example, be associated with a relatively large commercial account or customer of an insurance entity (and the survey feedback responses may be received from employees of the large commercial account). Note that any of the embodiments described herein may help grow a relationship between an insurer, sales, partner, distribution partner, and/or end customer (and potentially increase a volume and/or types of business between the parties).

Figure 18:
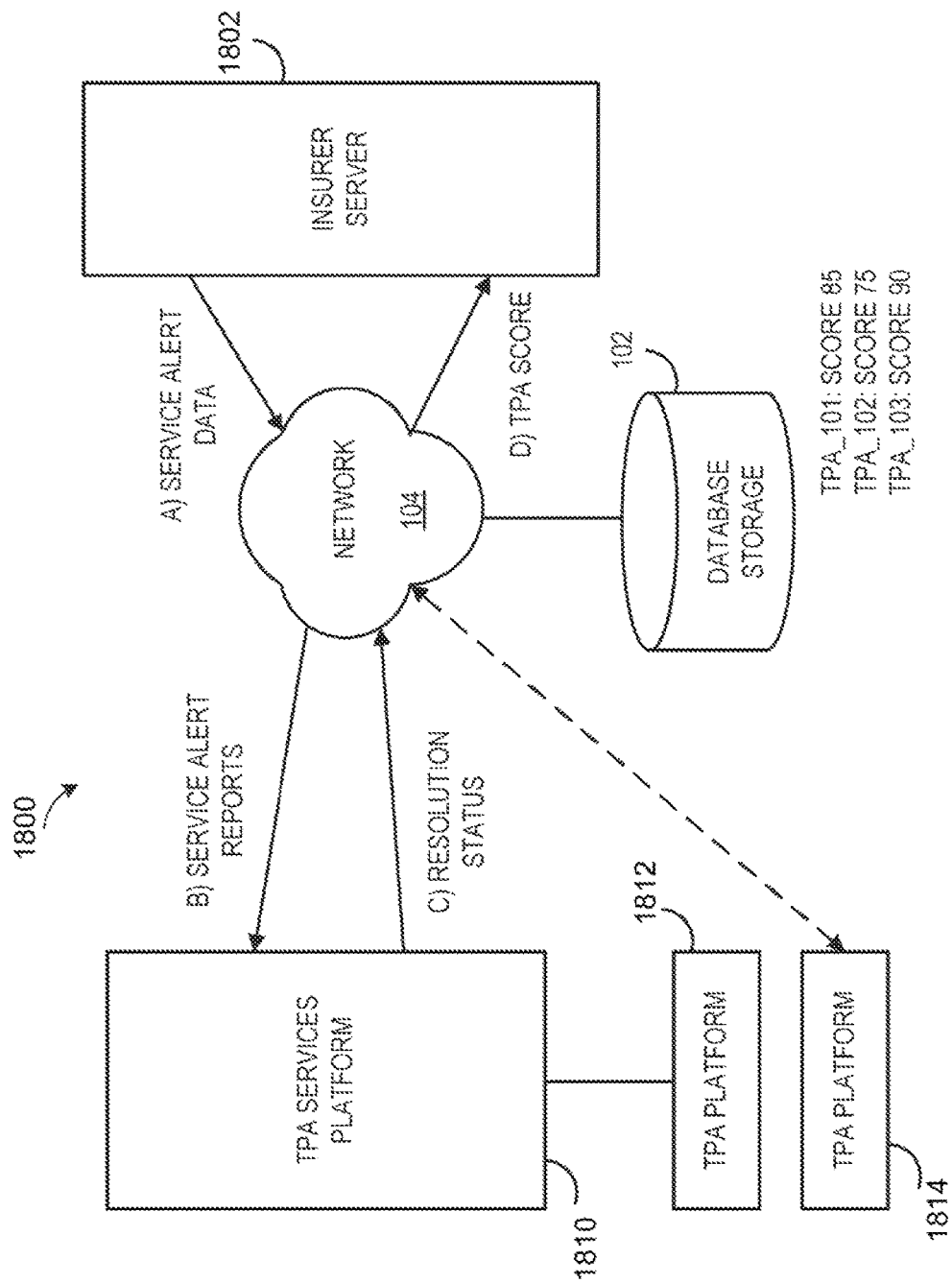
FIG. 18 illustrates a data flow between parties in connection with some embodiments described herein, and particularly embodiments relating to third party administrators.

In some cases, an insurance provider might use the systems of FIGS. 13 and/or 14 to improve services provided in connection with an insurance policy, For example FIG. 18 illustrates a data flow 1800 between parties in connection with some embodiments described herein. In particular, an insurer server 1802 may exchange information with a third party administrator services platform 1810 and/or a third party administrator platform 1812 via the network 104. At (A), insurer server 1802 may transmit service alert data. The service alert data might indicate, for example, that a claimant is less than complete satisfied with the processing of his or her insurance claim.

In some embodiments, the information may be received by the third party administrator services platform 1810 at (B) in form of one or more service alert reports. The third party administrator might comprise, for example, an organization that provides claim and administrative services acting behalf of an insurance company. In order to approve a third party administrator, a due diligence process might be performed and an Administrative Agreement (ASA) might define claims services premium administration standards, compliance requirements, confidentiality procedures, procedural workflows, and/or claim turn-around goals.

Figure 19:
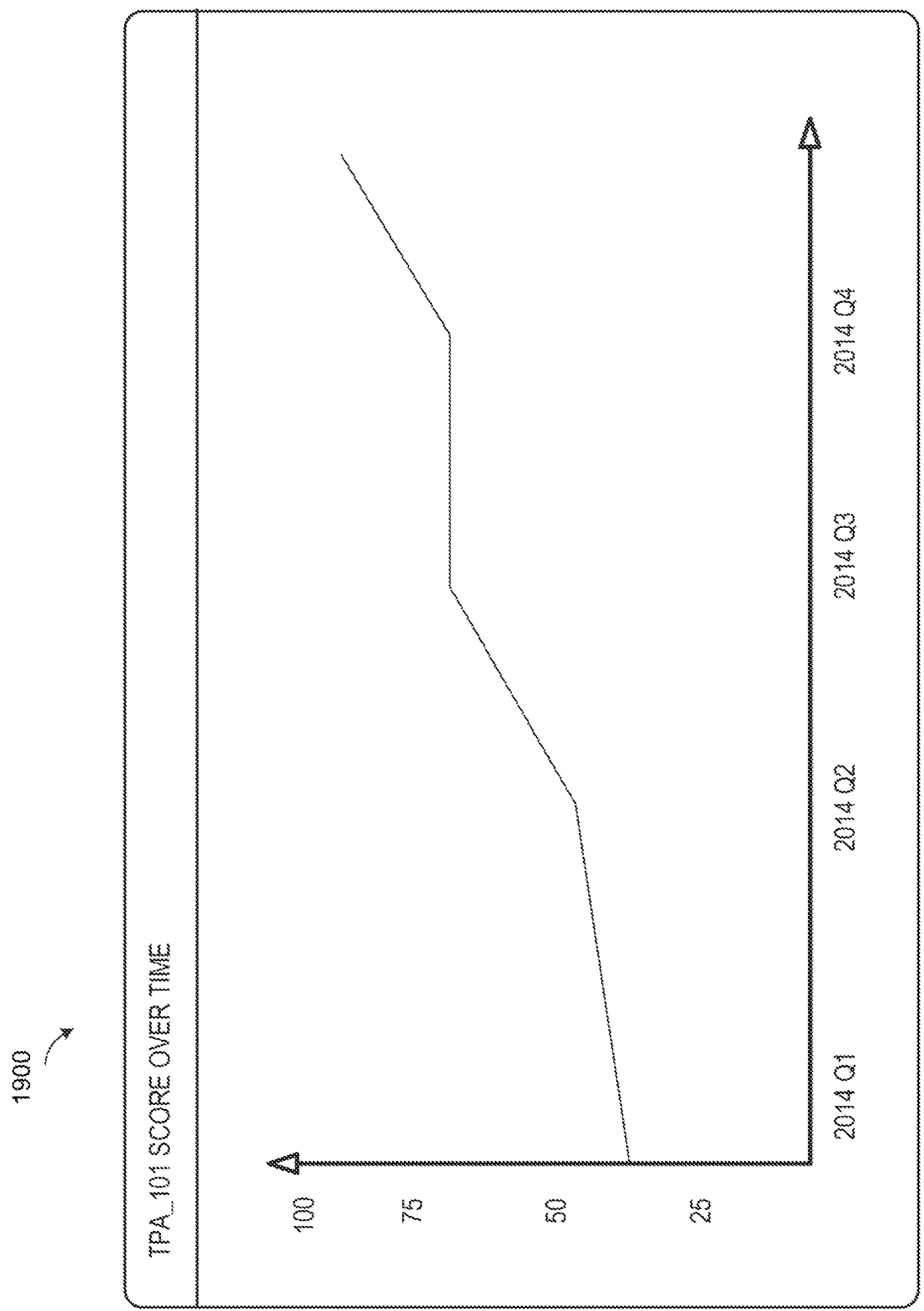
FIG. 19 illustrates a score display that might be provided in accordance with embodiments described herein.

The third party administrator services platform 1810 may transmit resolution status information at (C). The resolution status information might indicate, for example, that the claimant has been contacted and is now pleased with how his or claim is being handled. According to some embodiments, the third party administrator services platform 1810 transmits the resolution status information to database storage 102. The information then be used to grade or score the performance of the third party administrator (e.g., by assigned a score from 0 to 100 to the third party administrator). This score may be received by the insurer server 1802 at (D) and then be used to improve the service being provided to claimants. For example, FIG. 19 illustrates a score display 1900 that might be provided in accordance with embodiments described herein. Such a display 1900 may be used by an insurance provider to help ensure that a third party administrator is performing at an accepted level in accordance with the ASA.

Although a third party administrator "score" is described in connection with some embodiments described herein, note that other types of performance information might be used instead of or in addition to a score. For example, insurer server 1802 might generate reports including some or all of the following types of information: overall customer loyalty results (e.g., to establish a performance baseline, track and trend to achieve continuous improvements); workers compensation data (e.g., tracking lost time and/or medical only customer loyalty information); general liability customer loyalty information; customer loyalty information for open and/or closed claims; customer loyalty information for a particular insured party or account; customer loyalty information for a particular state; customer loyalty information for a particular type of injury; customer loyalty information for a particular office, manager, or handler; and success rate data (e.g., associated with complete surveys or a total number of attempts). According to some embodiments, customer comments may be mined to identify strengths and opportunities that will inform the standards, practices, procedures, training and/or execution of claims handling. Moreover, according to some embodiments, interim and loyalty survey results may be compared with respect to the same claim and an overall percentage of service alerts may be calculated. Note that each terminal referred to herein may, for example, be constituted by a conventional personal computer that is similar in its hardware aspects to the survey terminal described above with reference to FIG. 4.

Figure 22:
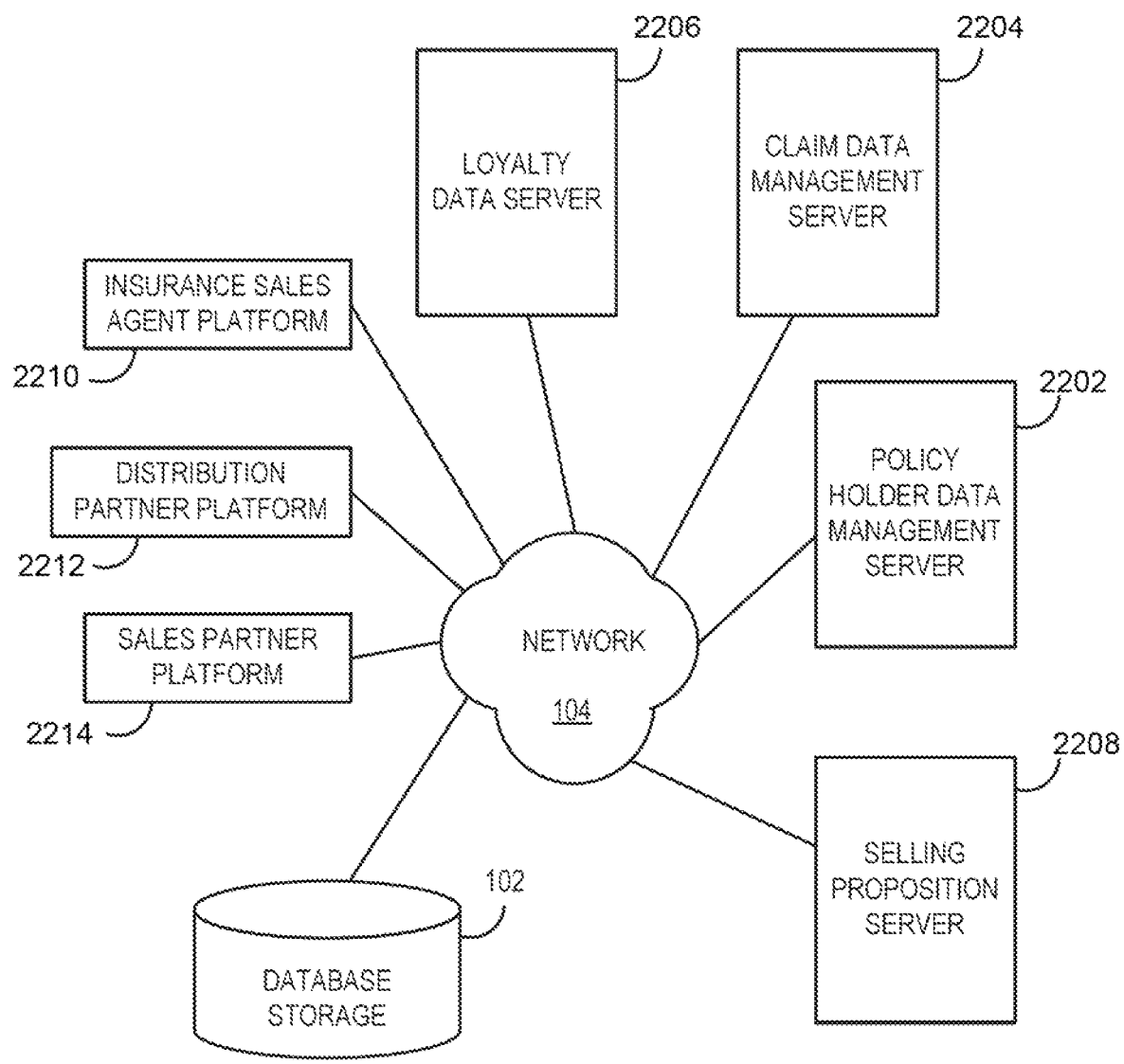
FIG. 22 is a block diagram that provides a representation of aspects of a system that includes other parties according to any of the embodiments described herein.

Note that parties other than third party administrators and the insurance entity itself might benefit from the receipt of customer feedback information. For example, FIG. 22 is a block diagram that provides a representation of aspects of a system including database storage 102, a data communication network 104, a policy holder data management server computer 2202, and a claim data management server computer 2204. The latter two servers may together constitute some or all of the functionality ascribed above to the data storage module 102 shown in FIG. 1. The policy holder data management server computer 2202 and the claim data management server computer 2204 may both be constituted and operated in a substantially conventional manner. The policy holder data management server computer 2202 may store data concerning policies in force with the insurance company, including names, addresses, etc. of policy holders, types and terms of coverage, policy effective dates, coverage amounts, etc. The claim data management server computer 2204 may store data concerning claims made against the insurance company, includes names and addresses of claimants, date of loss, and all other information accumulated during investigation and settlement/resolution of the claims. Other components of the computer system shown in FIG. 22 may include a loyalty data server computer 2206 and selling proposition server computer 2208.

Further, the computer system of FIG. 22 may include a number of insurance sales agent platforms 2210, a distribution partner platform 2212, and a sales partner platform 2214. By providing customer feedback information to an insurance sales agent platform 2210, the distribution partner platform 2212, and the sales partner platform 2214 (e.g., via an email, web site, or any other method), a sales agent may be able to proactively help resolve potential problems and/or take advantage of opportunities that may exist with especially satisfied customers (e.g., by asking the customer to post a recommendation on a social networking web site). Similarly, customer feedback information (including feedback information received before and/or after a claim is resolved) might be transmitted to the distribution partner platforms 2212 and/or the sales partner platforms 2214 to give a partner advance notice that a customer is potentially unsatisfied so that the partner can help the customer resolve issues. According to some embodiments, the customer feedback information might be used by the selling proposition server 2208 to identify additional services that might be offered to satisfied customers. In this way, the customer loyalty program may be leveraged as a differentiator in the marketplace because customer loyalty index results can be shared at a high-level with distribution partners and/or agents.

Moreover, the system of FIG. 22 may share scores (including individual survey results) and/or service alerts with agents and/or sales partners in real or substantially real-time to help resolve problems and/or identify potential sales opportunities.

Figure 20:
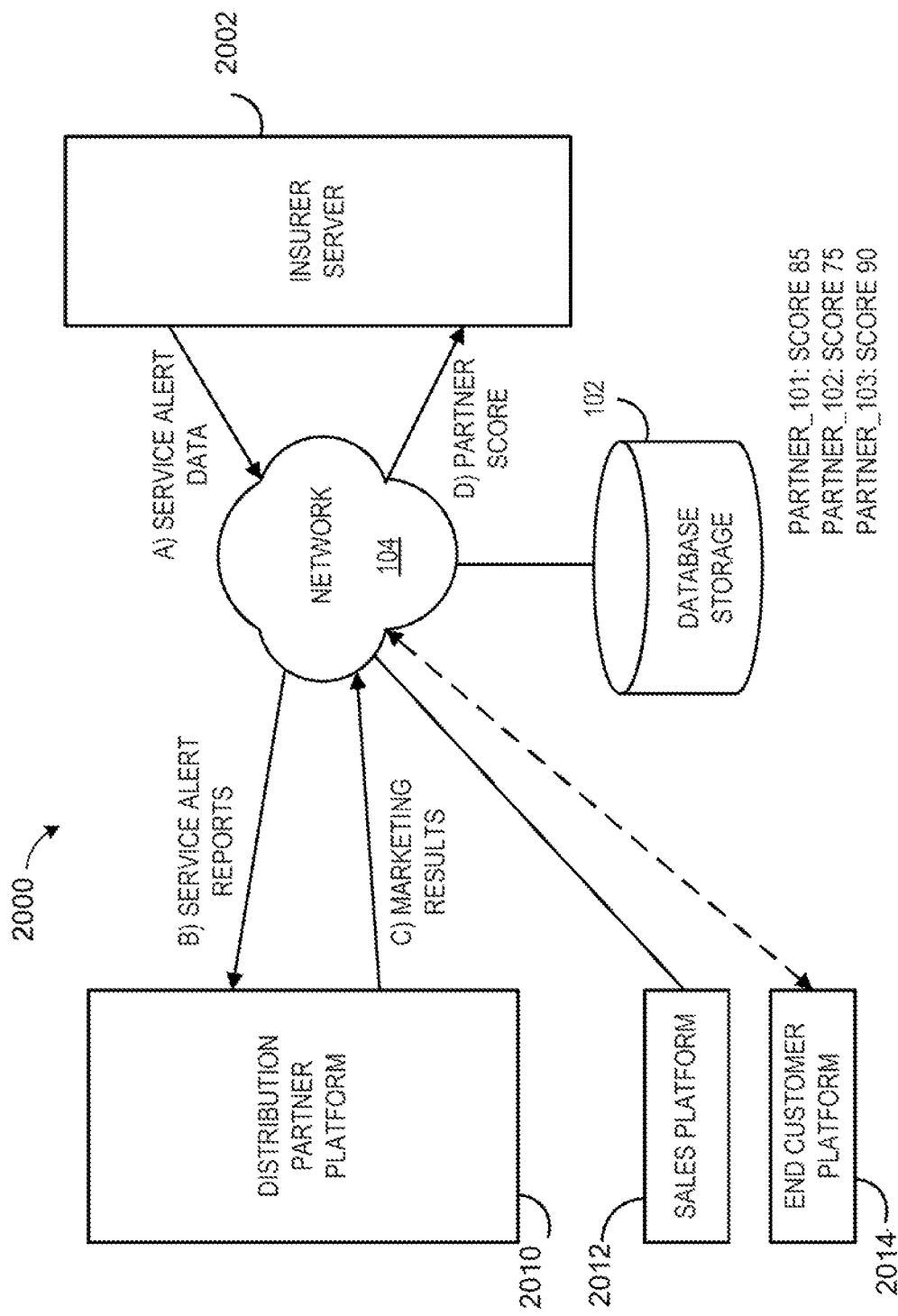
FIG. 20 illustrates a data flow between parties in connection with some embodiments described herein, and particularly embodiments relating to end customer platforms.

In some cases, an insurance provider might use the systems of FIGS. 13, 14 and/or 22 to improve services provided in connection with an insurance policy, For example FIG. 20 illustrates a data flow 2000 between parties in connection with some embodiments described herein. In particular, an insurer server 2002 may exchange information with a distribution partner platform 2010, a sales partner platform 2012, and/or an end customer 2014 via the network 104. At (A), insurer server 2002 may transmit service alert data. The service alert data might indicate, for example, that a claimant is less than completely satisfied with the processing of his or her insurance claim or that a claimant is very satisfied with the processing of his or her insurance claim.

In some embodiments, the information may be received by the partner platform 2010, 2012 at (B) in the form of one or more service alert reports. According to some embodiments, the partner platforms 2010, 2012 may use the services alert reports to reach out to customers (e.g., by offering to sell additional types of insurance to satisfied customers).

Figure 21:
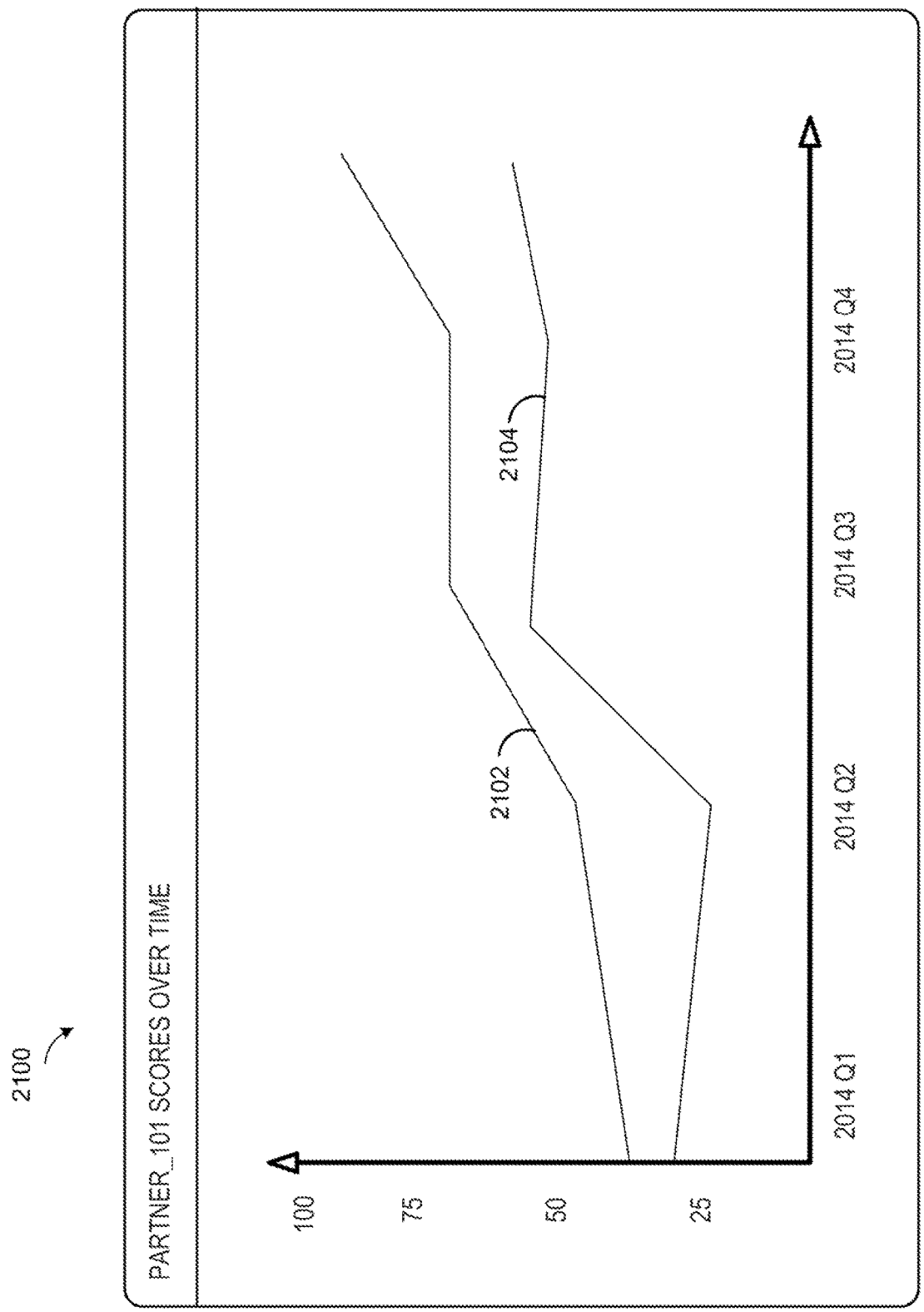
FIG. 21 illustrates a partner score display that might be provided in accordance with embodiments described herein.

The partner services platform 2010, 2012 may transmit marketing results at (C). The marketing results might indicate, for example, that ten customers have purchased additional policies (or that 45% have agreed to receive additional information about products and services offered by the partner platforms 2010, 2012). According to some embodiments, the partner platform 2010, 2012 transmits the marketing results to database storage 102. The information may then be used to grade or score the performance of the partner platform 2010, 2012 (e.g., by assigning a score from 0 to 100 to the partner platform 2010). This score may be received by the insurer server 2002 at (D) and then be used to improve the service being provided to customers. For example, FIG. 21 illustrates a score display 2100 that might be provided in accordance with embodiments described herein. Such a display 2100 may be used by an insurance provider to help ensure that a partner platform is performing at an accepted level. Note that difference scores 2102, 2104 might be displayed, for example, in connection with different types of insurance policies (e.g., automobile and homeowners insurance policies).

Although a partner platform "score" is described in connection with some embodiments described herein, note that other types of performance information might be used instead of or in addition to a score. For example, insurer server 2002 might generate reports including some or all of the following types of information: overall customer loyalty results (e.g., to establish a performance baseline, track and trend to achieve continuous improvements); workers compensation data (e.g., tracking lost time and/or medical only customer loyalty information); general liability customer loyalty information; customer loyalty information for open and/or closed claims; customer loyalty information for a particular insured party or account; customer loyalty information for a particular state; customer loyalty information for a particular type of injury; customer loyalty information for a particular office, manager, or handler; and success rate data (e.g., associated with complete surveys or a total number of attempts). According to some embodiments, customer comments may be mined to identify strengths and opportunities that will inform the standards, practices, procedures, training and/or execution of claims handling. Moreover, according to some embodiments, interim and loyalty survey results may be compared with respect to the same claim and an overall percentage of service alerts may be calculated. Note that each terminal referred to herein may, for example, be constituted by a conventional personal computer that is similar in its hardware aspects to the survey terminal described above with reference to FIG. 4.

Moreover, as used herein and in the appended claims, the term "customer feedback response" refers to a response to a survey question administered by or on behalf of an insurance company.

As used herein and in the appended claims, the term "open claim file" refers to a claim file in which a notice of claim has been received, and for which the claim has not been resolved or closed.

As used herein and in the appended claims, prompting a survey employee to administer a survey may include placing a claim file in the survey employee's work queue or otherwise bringing the claim file to the employee's attention.

As used herein and in the appended claims, the term "dashboard display" refers to any computer-presented screen display that includes presentation of statistical information with a display element in a dial format.

The process descriptions and flow charts contained herein should not be considered to imply a fixed order for performing process steps. Rather, process steps may be performed in any order that is practicable.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A selective remote interactive graphical display and data management system, comprising:
    a data storage device storing data indicative of a plurality of data records;
    a remote data acquisition computer, in communication with the data storage device, configured to:
        selectively trigger display actions for the data records based on at least a time-based rule and a time-independent rule;
        classify a portion of a response received from a remote user device to an initial question provided via a display interface on the remote user device, the display interface having a plurality of user-selectable options arranged to define a scale of values indicative of a user likelihood of recommending an entity to an individual known to the user, in one of two categories, the two categories being a potential-promoter category and a non-potential-promoter category, based on responses on the scale being below a first threshold value being classified as being in the non-potential-promoter category, and responses on the scale above a second threshold value being in the potential-promoter category;

based on a loyalty index value assigned to the portion of the response, the portion being classified as being in the potential-promoter category when the loyalty index value exceeds a threshold value, automatically transmit data relating to the user to a third party computer system, and exchange data with the third party computer system to determine a resolution status associated with the portion of the response; and analyze recordings of voice responses to surveys using at least one of voice recognition or machine text analysis to categorize responses as attention-required, and communicate to a third party administrator platform computer system responses categorized as attention-required in near real-time in order to permit contact to users providing survey results to effect a service recovery and resulting improved results on subsequent surveys;

a display interface generator configured to:

generate, responsive to the triggering by the remote data acquisition computer, for display on the display interface on the remote user device, the display interface having the plurality of user-selectable options arranged to define a scale of values indicative of a user likelihood of recommending an entity to an individual known to the user;

responsive to the portion of the response being classified by the remote data acquisition computer in the potential-promoter category, automatically generate for display on the display interface, data indicative of a supplemental interface portion, including a request for permission to provide the response to the initial question to an audience including persons not known to the user; and responsive to the portion of the response being classified by the remote data acquisition computer in the non-potential-promoter category, automatically generating for display on the remote interface, data indicative of a conclusion message to be displayed on the remote user device; and a database storage unit storing data indicative of a plurality of responses to the initial question and the supplemental interface portion.

2. The system of claim 1, wherein the remote data acquisition computer is further configured to:

classify the portion of the response by assigning the loyalty index value to the portion, wherein the loyalty index value is on a scale of loyalty index values.

3. The system of claim 1, wherein the display includes an element labeled as ending interactions with the user, the element being associated with code operative to transmit the user's response to the supplemental interface portion request, the display interface generator being configured to end the interactions with the user upon receipt of the response to the supplemental interface portion request transmitted responsive to user selection of the element.

4. The system of claim 1, wherein the supplemental interface portion includes a question asking for the user's permission to include information about the user in a testimonial marketing message.

5. The system of claim 4, wherein the testimonial marketing message includes social network Internet platform information about the user and a social network Internet platform approval indication by the user, wherein the social network Internet platform approval indication comprises an approval indication actuated on the social network Internet platform by the user.

6. The system of claim 5, wherein the display interface generator is further configured to, responsive to receipt of data indicative of user permission to include information about the user in the testimonial marketing message, automatically generate data indicative of a release form for display on the user device.

7. The system of claim 1, further comprising displaying a conclusion message on the user interface responsive to receipt of the response to the supplemental interface portion request transmitted responsive to user selection of a complete survey icon displayed on the user interface.

8. The system of claim 1, wherein the entity is an insurance company, and the portion of the feedback is received after a notice of an insurance claim associated with the user is received by the insurance company.

9. The system of claim 8, wherein the user is other than an insured under a policy issued by the insurance company.

10. The system of claim 1, wherein the data records correspond to insurance claims, and the initial question is associated with an interim loyalty survey for an open one of the insurance claims selected for the interim loyalty survey from a plurality of insurance claims open for a threshold number of days after a first notice of loss.

11. The system of claim 10, wherein the portion of the response is received before the claim is resolved.

12. The system of claim 10, wherein the portion of the response is received after the claim is resolved.

13. A selective remote interactive graphical display and data management method, comprising:

selectively triggering, by a remote data acquisition computer, in communication with a data storage device storing data indicative of a plurality of data records, display actions for the data records based on at least a time-based rule and a time-independent rule;

generating, by a display interface generator, for display on a display interface on a remote user device, responsive to the triggering by the remote data acquisition computer, a display interface having an initial question and a plurality of user-selectable options arranged to define a scale of values indicative of a user likelihood of recommending an entity to an individual known to the user;

receiving from the remote user device, data indicative of a received portion of a response comprising a selected one of the user-selectable options;

classifying, by the remote data acquisition computer, the received portion of the response, in one of two categories, the two categories being a potential-promoter category and a non-potential-promoter category, based on responses on the scale being below a first threshold value being classified as being in the non-potential-promoter category, and responses on the scale above a second threshold value being in the potential-promoter category;

based on a loyalty index value assigned to the portion of the response, the portion being classified as being in the potential-promoter category when the loyalty index value exceeds a threshold value, automatically transmitting, by the display interface generator, data relating to the user to a third party computer system, and exchanging data with the third party computer system to determine a resolution status associated with the portion of the response;

responsive to the portion of the response being classified by the remote data acquisition computer in the potential-promoter category, automatically generating, by a display interface generator, for display on the remote interface, data indicative of a supplemental portion, including a request for permission to provide the response to the initial question to individuals not known to the user;

responsive to the portion of the response being classified by the remote data acquisition computer in the non-potential-promoter category, automatically, by the display interface generator, ending the survey and generating for display on the remote interface, data indicative of a conclusion message to be displayed on the remote user device;

storing data indicative of the response in a data storage device; and analyzing, by the remote data acquisition computer, recordings of voice responses to surveys using at least one of voice recognition or machine text analysis to categorize responses as attention-required, and to communicate to a third party administrator platform computer system the responses categorized as attention-required in near real-time in order to permit contact to users providing the survey results to effect a service recovery and resulting improved results on subsequent surveys.

14. The method of claim 13, further comprising:
classifying, by the remote data acquisition computer the portion of the response by assigning the loyalty index value to the portion, wherein the loyalty index value is on a scale of loyalty index values.

15. The method of claim 14, further comprising:
generating, by the display interface generator, on the display interface an element labeled as ending interactions with the user, the element being associated with code operative to transmit the user's response to the supplemental portion request; and
responsive to receipt of the response to the supplemental portion request transmitted responsive to user selection of the element, ending, by the display interface generator, the interactions with the user.

16. A selective remote interactive graphical display and data management system, comprising:
a data storage device, in communication with a network, storing data indicative of a plurality of data records, including a plurality of supervisor terminal network addresses;
a remote data acquisition computer, in communication with the network, configured to selectively trigger display actions for the data records based on at least a time-based rule and a time-independent rule;
a plurality of survey terminals in communication with the network, the survey terminals configured to acquire data records from the data storage device for which customer satisfaction surveys are to be performed, permit a survey terminal user to access a work queue and access individual data records, and to guide a survey terminal user in performing the customer satisfaction surveys;
a plurality of supervisor terminals, each having a network address, in communication with the network;
a remote data acquisition computer, in communication with the network, configured to:

classify a portion of a survey response received from a remote user device to an initial survey question provided via a display interface on the remote user device, the display interface having a plurality of user-selectable options arranged to define a scale of values indicative of a user likelihood of recommending an entity to an individual known to the user, in one of two categories, the two categories being a potential-promoter category and a non-potential-promoter category, based on responses on the scale being below a first threshold value being classified as being in the non-potential-promoter category, and responses on the scale above a second threshold value being in the potential-promoter category;

based on a loyalty index value assigned to the portion of the response, the portion being classified as being in the potential-promoter category when the loyalty index value exceeds a threshold value, automatically transmit data relating to the user to a third party computer system, and exchange data with the third party computer system to determine a resolution status associated with the portion of the response; and analyze recordings of voice responses to surveys using at least one of voice recognition or machine text analysis to categorize responses as attention-required, and to communicate to a third party administrator platform computer system the responses categorized as attention-required in near real-time in order to permit contact to users providing the survey results to effect a service recovery and resulting improved results on subsequent surveys;

a display interface generator, in communication with the network, configured to:
generate, responsive to the triggering by the remote data acquisition computer, for display on the display interface on the remote user device, the display interface having the plurality of user-selectable options arranged to define a scale of values indicative of a user likelihood of recommending an entity to an individual known to the user;
responsive to the portion of the survey response being classified by the remote data acquisition computer in the potential-promoter category, automatically generate for display on the display interface, data indicative of a supplemental survey portion, including a request for permission to provide the response to the initial question to an audience including persons not known to the user; and
responsive to the portion of the response being classified by the remote data acquisition computer in the non-potential-promoter category, automatically generating for display on the remote interface, data indicative of a survey conclusion message to be displayed on the remote user device; and
a database storage unit, in communication with the network, storing data indicative of a plurality of survey responses;
wherein the data acquisition computer is further configured to, in response to a determination that the survey response is below a pre-determined threshold value, electronically route the data record associated with the survey response to the supervisor terminal having a corresponding network address for attention.

17. The system of claim 16, wherein the remote data acquisition computer is further configured to:

classify the portion of the response by assigning the loyalty index value to the portion, wherein the loyalty index value is on a scale of loyalty index values.

18. The system of claim 16, wherein the display interface includes an element labeled as ending interactions with the user, the element being associated with code operative to transmit the user's response to the supplemental survey portion request, the display interface generator being configured to end the interactions with the user upon receipt of the response to the supplemental survey portion request transmitted responsive to user selection of the element.

\* \* \* \* \*